United States Patent [19]

Chenausky

[11] Patent Number: 4,908,585

[45] Date of Patent: * Mar. 13, 1990

[54] RF TRANSFORMER AND DIAGNOSTIC TECHNIQUE THEREFOR

[76] Inventor: Peter P. Chenausky, 151 Deercliff Rd., Avon, Conn. 06001

[*] Notice: The portion of the term of this patent subsequent to Feb. 28, 2006 has been disclaimed.

[21] Appl. No.: 316,022

[22] Filed: Feb. 27, 1989

Related U.S. Application Data

[63] Continuation of Ser. No. 171,629, Mar. 22, 1988, said Ser. No. 171,679, is a continuation-in-part of Ser. No. 728,744, Apr. 30, 1985, Pat. No. 4,751,717.

[51] Int. Cl.[4] .............................................. H01P 5/00
[52] U.S. Cl. ................ 333/24 R; 333/24 C; 333/219; 372/82; 372/87; 372/38
[58] Field of Search ....................... 372/83, 87, 38, 86, 372/82; 333/24 R, 24 C, 219

[56] References Cited

U.S. PATENT DOCUMENTS

| | | | |
|---|---|---|---|
| 4,363,126 | 12/1982 | Chenausky et al. | 372/82 |
| 4,365,337 | 12/1982 | Cirkel et al. | 372/87 |
| 4,373,202 | 2/1983 | Laakmann et al. | 372/83 |
| 4,423,510 | 12/1983 | Pack et al. | 372/87 |
| 4,493,087 | 12/1985 | Laakmann et al. | 372/87 |
| 4,521,889 | 6/1985 | Cirkel et al. | 372/87 |
| 4,631,732 | 12/1986 | Christensen | 372/82 |
| 4,701,727 | 10/1987 | Wong | 333/219 |
| 4,751,717 | 6/1988 | Chenausky | 372/82 |

Primary Examiner—Leon Scott, Jr.
Attorney, Agent, or Firm—Chilton, Alix & Van Kirk

[57] ABSTRACT

An RF transformer employs at least three elongated conductive elements in generally parallel spaced relationship. At least a first inductive element is connected between a pair of the conductive elements to provide a desired field distribution. A diagnostic technique for determining the frequency shift of the transformer employs a perturbing object which is selectively longitudinally positioned within the transformer. The transformer has particular utility as an RF excited gas laser.

18 Claims, 18 Drawing Sheets

FIG. 3
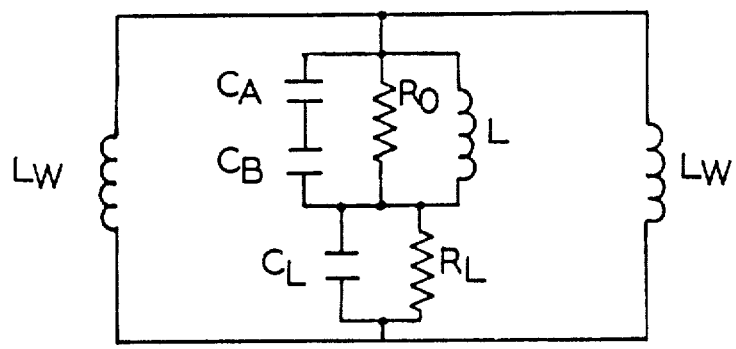
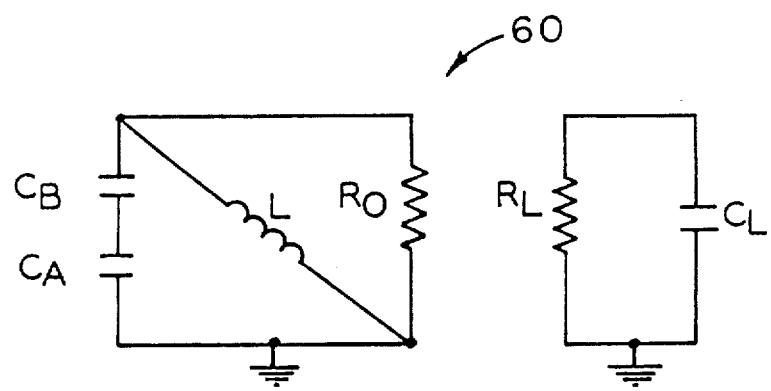
FIG. 4

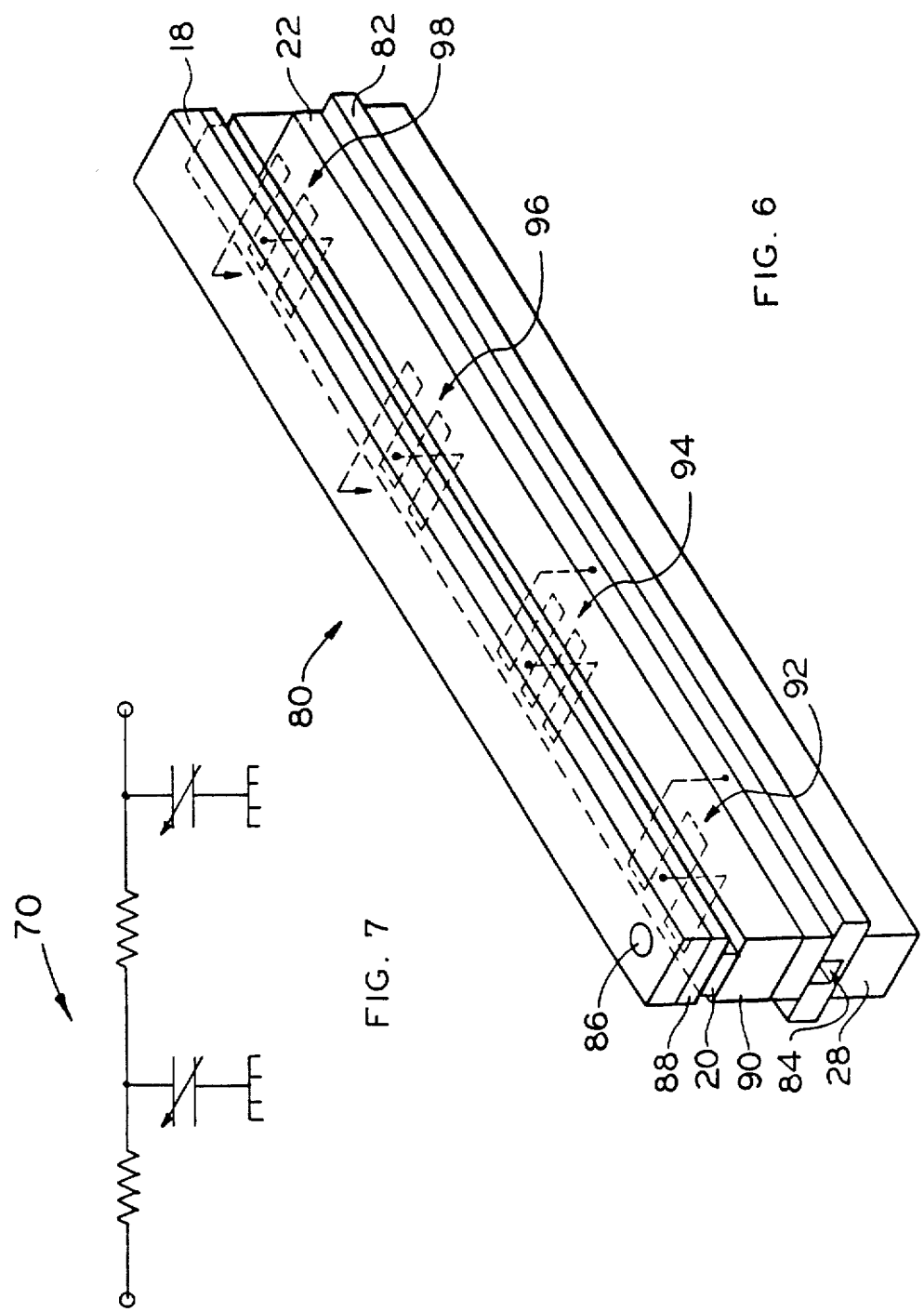

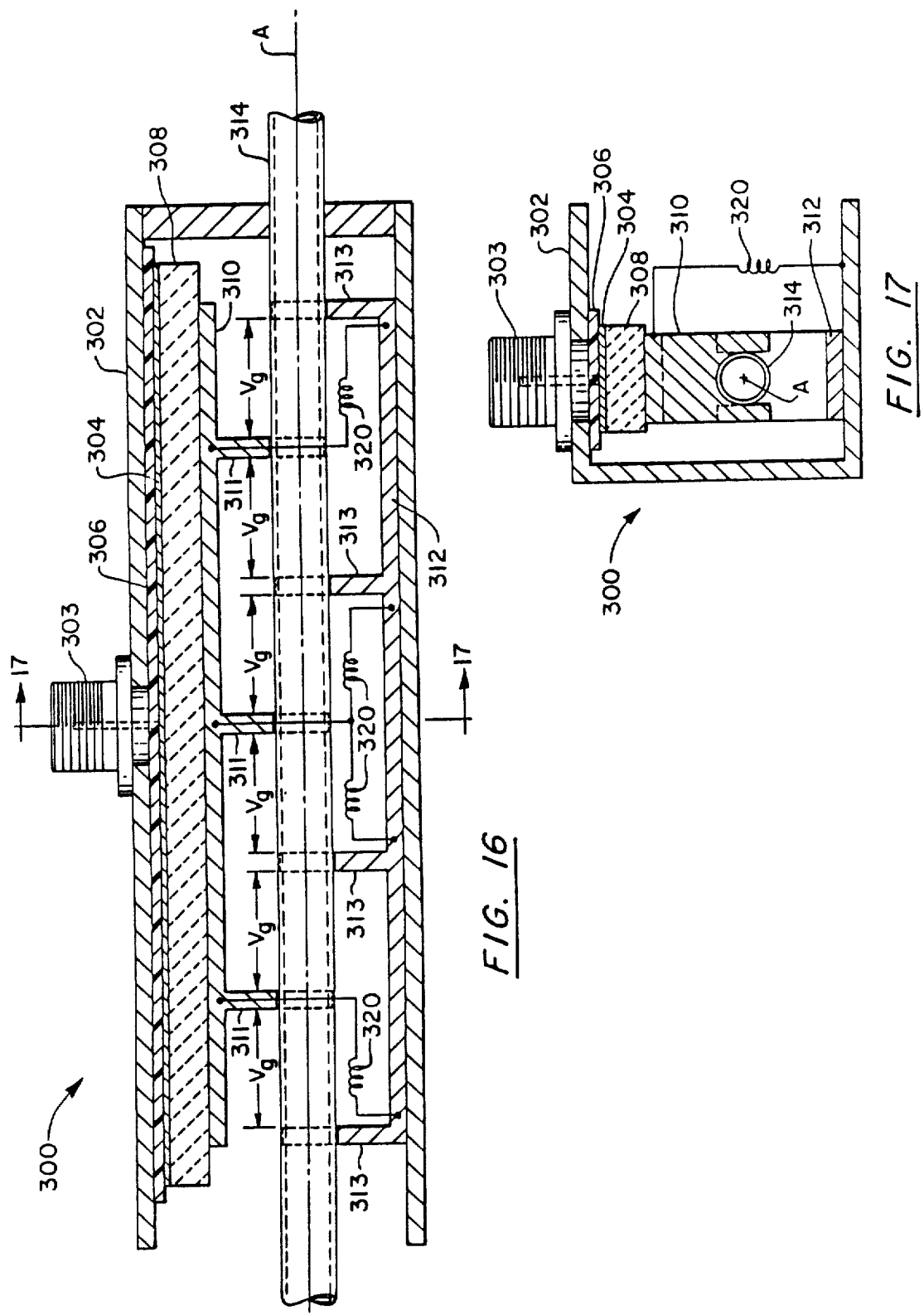

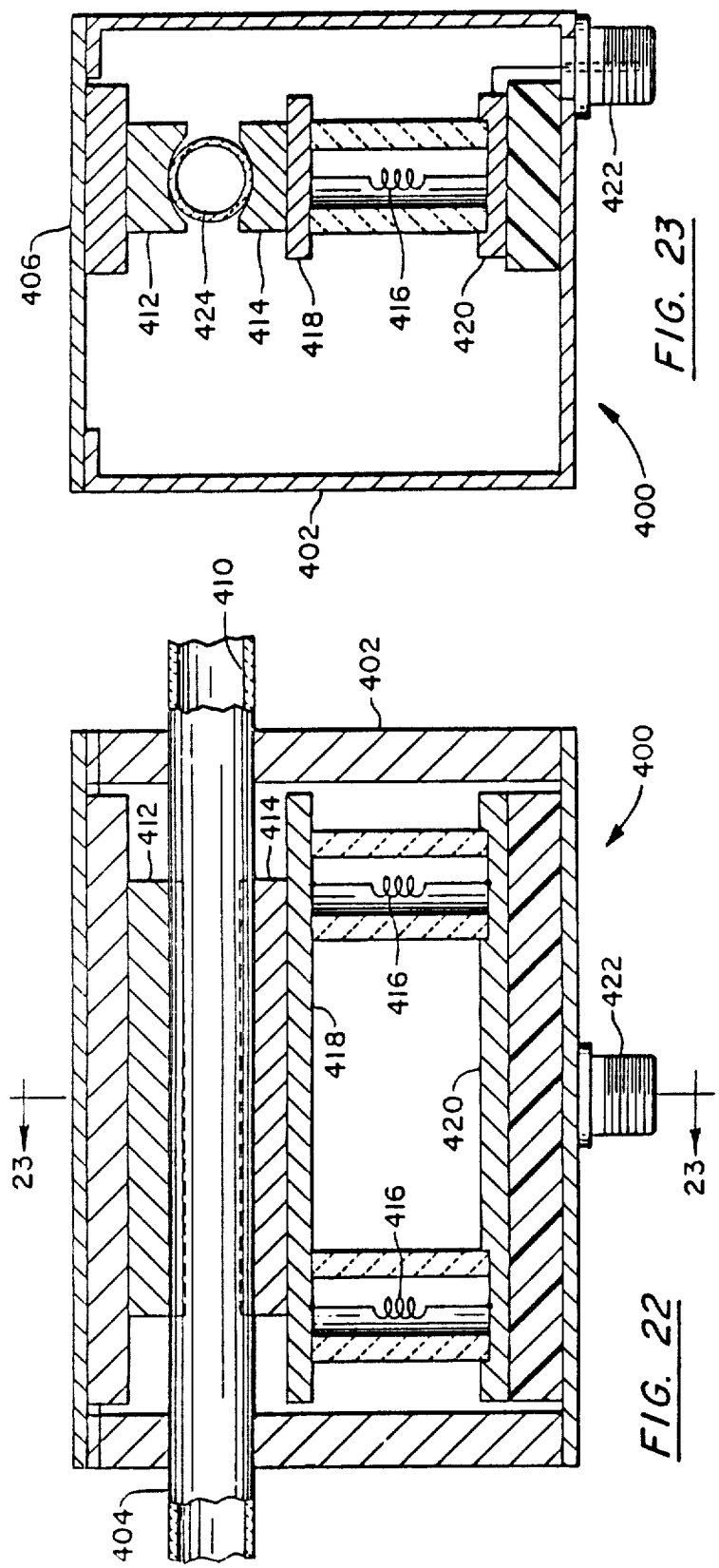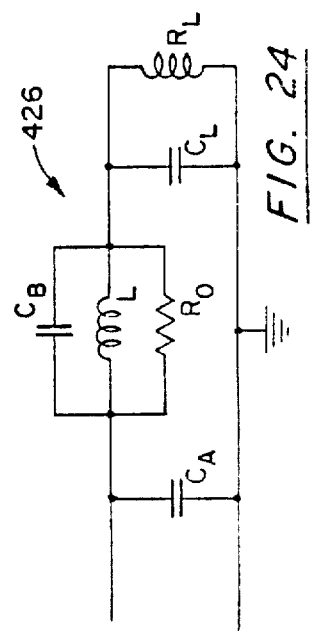
FIG. 22
FIG. 23
FIG. 24

RF TRANSFORMER AND DIAGNOSTIC TECHNIQUE THEREFOR

CROSS-REFERENCE TO RELATED APPLICATIONS

This application is a continuation of U.S. Patent Application Ser. No. 171,679 filed Mar. 22, 1988. Application Ser. No. 171,679 is a continuation-in-part of U.S. Patent Application Ser. No. 728,744 filed Apr. 30, 1985, now U.S. Pat. No. 4,751,717.

BACKGROUND OF THE INVENTION (1) Field of the Invention

This invention relates to RF transformers. More particularly, the present invention is directed to RF transformers particularly well-suited to be employed for exciting gas lasers with a transverse RF discharge and to a diagnostic technique therefor. Accordingly, the general objects of the present invention are to provide novel and improved apparatus and methods of such character.

(2) Description of the Prior Art

While not limited thereto in its utility, the present invention is particularly well-suited for use in association with RF excited gas lasers. U.S. Pat. Nos. 4,169,251, 4,352,188 4,363,126, 4,429,398 and 4,443,877 generally disclose RF excited gas lasers which employ two opposing conducting surfaces between which a transverse gas discharge is created. U.S. Pat. No. 4,169,251 discloses a wave guide laser which is excited by means of a transverse discharge at sufficiently high RF frequencies to insure negligible interaction of discharge electrons with the discharge establishing electrodes. U.S. Pat. No. 4,352,188 discloses an RF pumped wave guide laser wherein a transverse RF excitation voltage at a frequency of at least thirty (30) MHz is applied between elongated electrodes on opposite sides of a laser discharge chamber. A plurality of shunt inductances are coupled between the opposing electrodes externally of the chamber at periodically spaced positions along the length of the chamber to provide a negative admittance which compensates for the variation of the phase angle of the transmission line reflection coefficient along the length of the laser discharge chamber. The variation in the magnitude of the voltage standing wave ratio (VSWR) along the laser chamber produced by the excitation voltage is thereby reduced.

U.S. Pat. No. 4,363,126 discloses an RF excited gas laser which employs a tuned circuit having a resonant frequency wherein the real part of the complex impedance of the discharge chamber is matched to the output impedance of a driving oscillator by placing an inductive element in parallel with the laser discharge chamber resistance and capacitance. The value of the inductance is selected so that the resonant frequency of the discharge chamber tuned circuit created by the addition of the inductive element has a predetermined relationship to the RF driving frequency of the laser. An input circuit compensates for the reactive part of the discharge chamber impedance.

A principal technical problem associated with RF excited gas lasers is the transmission line effects which result from increasing the electrical length of the laser or the excitation frequency of the laser, the electrical length of a laser being proportional to the excitation frequency and the physical length of the laser. Increasing the electrical length of the laser tends to adversely affect the discharge uniformity and consequently reduces the operating efficiency and the obtainable output power of the laser resulting in a laser with low output power per unit length. Another principal deficiency of conventional RF excited gas lasers is the inefficient power transfer between the RF driving source and the gas discharge.

BRIEF SUMMARY OF THE INVENTION

In accordance with the general objects of the present invention, a new and improved RF transformer particularly well-suited for use in a transverse RF excited gas laser overcomes many of the deficiencies of the prior art by providing improved longitudinal discharge uniformity and improved power transfer to the discharge region, i.e., the gas discharge in a RF gas laser. A diagnostic technique associated with the RF transformer provides information relative to the output impedance level of and longitudinal voltage variation along the RF transformer. This technique is useful in determining the relative voltage variation along a gas discharge chamber.

Briefly stated, the invention comprises an RF transformer which defines a narrow elongated cavity. In a preferred embodiment, four elongated electrically conductive elements are disposed in spaced relationship within the cavity. The first and fourth elements are grounded. A power supply which provides a voltage in the 25 MHz to 1,000 MHz range is applied between first and second of these conductive elements. An inductive connection between two of the conductive elements, for example the first and third elements, enables establishment of a higher output voltage which is measured between the third and fourth conductive elements. The output voltage has a magnitude which does not substantially vary along the longitudinal axis of the cavity and provides a preestablished impedance transformation to the region between the third and fourth conductive elements. In a preferred application, the region between the third and fourth elements comprises the transverse gas discharge chamber of an RF excited gas laser, the region between the first and second and the second and third conductive elements is preferably substantially occupied by a low loss dielectric material.

The output impedance level and voltage, i.e., the field strength, variation along the transformer in the gap between the third and fourth conductive elements is measured by introducing a perturbing object in the transformer output gap. The perturbing object is interposed at various positions along the gap and the resulting frequency shift of the input VSWR level yields the desired absolute or relative field information.

BRIEF DESCRIPTION OF THE DRAWING

FIG. 3 is a circuit diagram of a simplified equivalent circuit for the transformer of FIG. 2;

FIG. 4 is a circuit diagram of an equivalent compound circuit for the transformer of FIG. 2;

FIG. 6 is a schematic fragmentary perspective view of a third embodiment of an RF transformer in accordance with the present invention, the transformer of FIG. 6 being adapted for developing a confined gas discharge therein;

FIG. 7 is a circuit diagram for a matching circuit employed with the transformer of FIG. 6;

FIG. 16 is a longitudinal sectional view, partly in schematic, of a fifth embodiment of an RF transformer in accordance with the present invention, the transformer of FIG. 16 adapted as an interdigitated longitudinal discharge device;

FIG. 17 is a cross-sectional view, partly in schematic, taken along the line 17—17 in FIG. 16;

FIG. 22 is an enlarged longitudinal sectional view, partly in schematic, of a seventh embodiment of an RF transformer in accordance with the present invention, the transformer of FIG. 22 incorporating an external clamp-on type circuit;

FIG. 23 is a cross-sectional view, partly in schematic, taken along the line 23—23 of FIG. 22;

FIG. 24 is a circuit diagram of an equivalent circuit for the circuit of FIG. 22;

DETAILED DESCRIPTION OF THE INVENTION

Figure 1:
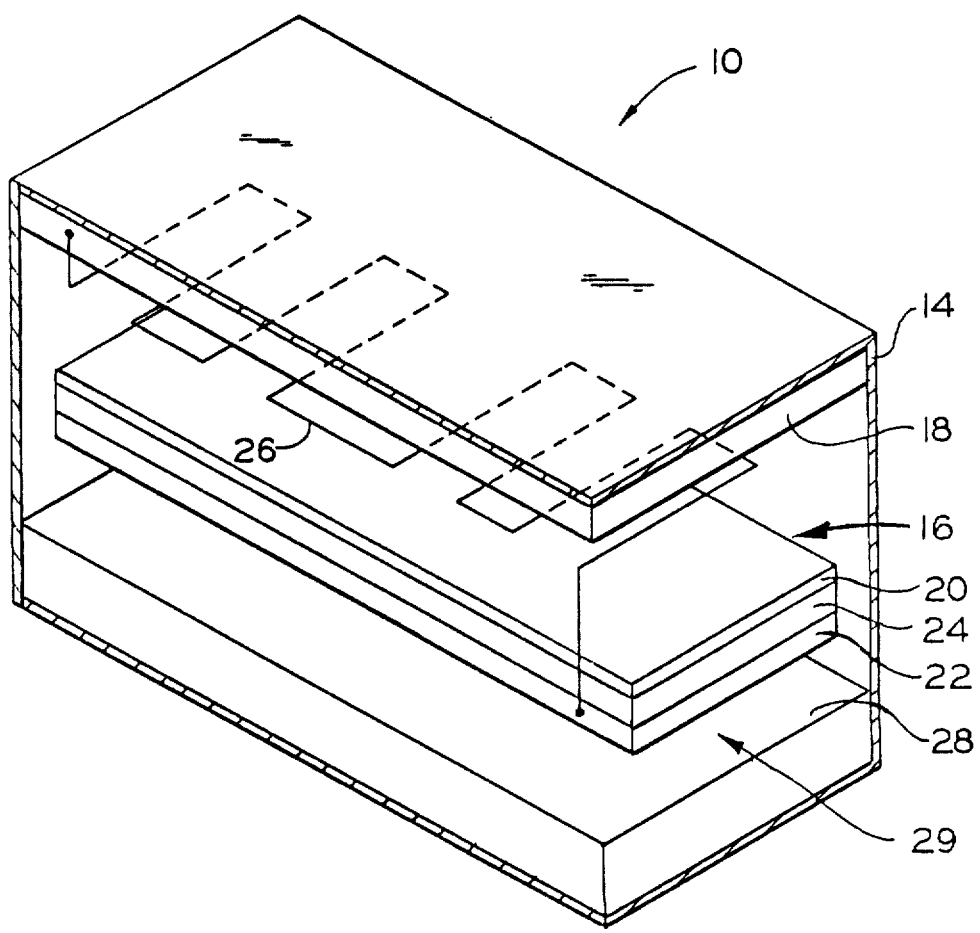
FIG. 1 is a schematic fragmentary perspective view illustrating an RF transformer in accordance with a first embodiment of the present invention.

With reference to the drawing wherein like numerals represent like parts throughout the several Figures, an RF transformer in accordance with the invention is generally designated by the numeral 10. RF transformer 10 is particularly well-suited for use in supplying an excitation voltage to a gas discharge in an RF excited gas laser. A preferred application of RF transformer 10 is in a wave guide laser. However, the invention may also be employed in RF excited gas lasers whose optical resonators support free space stable or unstable modes, as well as numerous other applications requiring an RF transformer.

With reference to FIG. 1, the basic geometrical characteristics and relationships of RF transformer 10 are illustrated. An elongated substantially rectangular housing 14 defines an elongated longitudinally extending cavity 16. Cavity 16 has a uniform substantially rectangular cross-section. An elongated grounded electrically conductive element 18 is mounted at the top of cavity 16 in a fixed relationship to the walls of housing 14. Conductive element 18 is in electrical contact with the interior wall of housing 14 and generally extends longitudinally substantially parallel to the central longitudinal axis of cavity 16. Conductive element 18 has a uniform thickness and a uniform width.

A second electrically conductive element 20 and a third electrically conductive element 22 of elongated form are supported in spaced relationship and typically are oriented substantially parallel to element 18. Conductive element 20 is disposed between elements 18 and 22. Conductive elements 20 and 22 are separated by an elongated separator strip 24 having a substantially uniform thickness. Strip 24 is comprised of a low loss dielectric material such as "Teflon" or an aluminum oxide ceramic material. A copper wire generally designated by the numeral 26 electrically connects element 18 to element 22. Wire 26 is configured to form a number of turns or inductive units to provide the transformer inductance. Wire 26, and in particular the formed inductive units, are positioned in the region of cavity 16 which lies between elements 18 and 20. The illustrated turns or windings of wire 26 are, of course, a schematic representation.

An elongated ground plate 28 is also electrically connected to housing 14 and typically is mounted in fixed relationship against the bottom panel of housing 14. Plate 28 will usually be oriented parallel with respect to element 22. The region between ground plate 28 and element 22 defines a discharge cavity region 29. When transformer 10 acts as a step-up transformer, elements 18 and 20 function as the input terminals for the transformer and element 22, and ground plate 28 functions as the output terminals. Housing 14 may be of a rectangular, cylindrical or other form which is selected so that the housing will have a relatively low inductance relative to the transformer inductance. The foregoing transformer is preferably configured so that the discharge cavity 29 between element 22 and ground plate 28 is substantially free of any circuit magnetic fields. The transformer of FIG. 1 can be employed to develop a high voltage RF signal at, for example, 150 MHz.

The spacing between element 22 and plate 28 may be varied, by means not shown, to some other dimension by replacing either or both element 22 and plate 28 with components of lesser or greater height. Since a change in the load capacitance will effect the operative frequency of the transformer, the length of inductor 26 will have to be changed to compensate for the change in capacitance. For a given frequency of operation, if the gap, i.e., the width, of region 29 is increased, the length of inductor wire 26 will have to be either made longer, or, if only a small change is required, the wire from which inductor 26 is made may be kept the same length but made of smaller diameter material.

For a given frequency of operation the impedance transformation ratio may be altered by moving the location of element 20 in relation to that of elements 18 and 22. Since element 18 is a grounded element, one method of easily determining whether element 24 should be made thicker or thinner is to invert the elements 18, 20, 22, 24 and 26 as a single unit. This effectively moves element 20 closer to ground and will generate a higher transformer impedance ratio. Elements 20 and 22 must, however, have a constant spacing if a constant impedance ratio along the longitudinal dimension is to be maintained.

Figure 2:
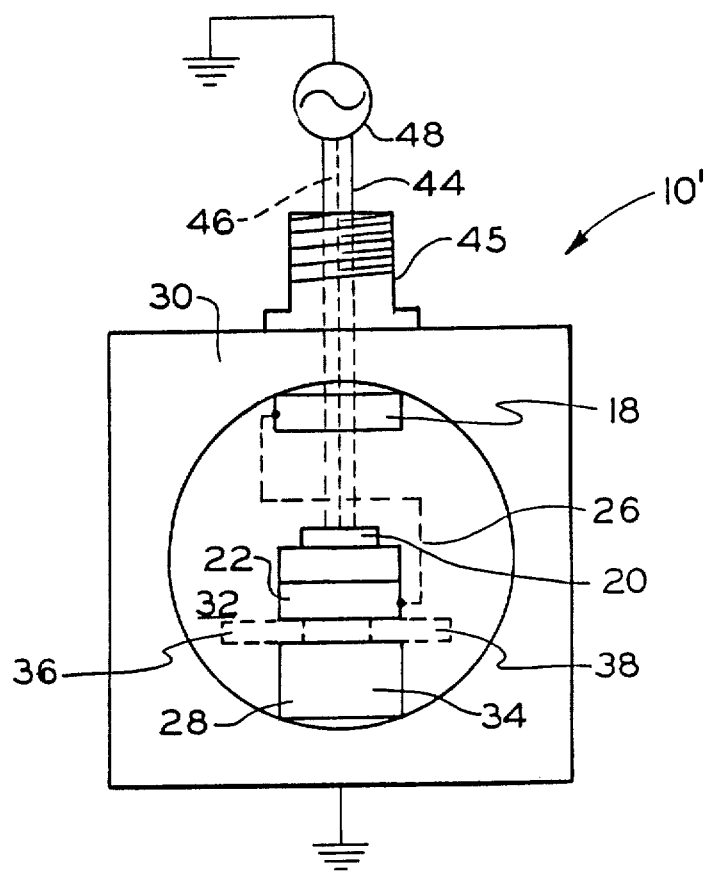
FIG. 2 is a cross-sectional side elevation view of a second embodiment of the RF transformer of the present invention.

With reference to FIG. 2, an alternate RF transformer embodiment adapted for incorporation into an RF excited laser is generally designated by the numeral 10'. A housing 30 is formed from a cube of aluminum, and in one reduction to practice, had a three-inch edge. A central bore 32, having a diameter of 2.250 inches in the example being discussed, extends longitudinally through opposing sides of the housing. Element 18 and plate 28 are, as in the FIG. 1 embodiment, grounded. An optical guided wave discharge chamber 34 is defined between element 22 an ground plate 28 and parallel dielectric spacers 36 and 38 (illustrated in dashed lines). Elements 22, 28, 36 and 38 are spaced to form an optical cavity having a uniform transverse dimension on the order of 0.090 square inch and a length perpendicular to the plane of the drawing of approximately 2.5 inches. The cavity may be further defined by conventional mirrors (not illustrated) for resonating laser radiation. An RF oscillator 48 supplies power via a coaxial cable 45 whose inner conductor 46 is electrically connected to conductive element 20. Inner conductor 46 is enclosed by a tubular insulator 44 that is extended to element 20 and is disposed in generally perpendicular relationship to element 20. Oscillator 48 and the coaxial cable 45 have a standard real output impedance of 50 ohms.

A simplified compound equivalent circuit for RF transformer 10' is illustrated in FIG. 3. Longitudinal transmission line effects may be disregarded since the transformer components are less than 0.03 wavelengths in length. The distributed capacitance between the grounded conductive element 18 and the intermediate ungrounded conductive element 20 is denoted by $C_A$. The capacitance between the ungrounded conductive element 20 and conductive element 22 is denoted by $C_B$ while the series inductance of the wire 26 connecting elements 18 and 22 is denoted by L. The equivalent shunt loss of inductor L is denoted by $R_O$. The inductance of the transformer housing enclosure is denoted by $L_W$. The capacitance into which the transformer is to be loaded is denoted by $C_L$. The resistance into which the transformer is to be loaded is denoted by $R_L$.

If the transformer inductance L is large relative to the housing inductance $L_W$ in the principal frequency region for the transformer, the load capacitance $C_L$ and the load resistance $R_L$ are effectively in parallel with the transformer components. An equivalent compound circuit for the latter relationship is illustrated in FIG. 4. Therefore, although the components of transformer 10' are arranged to be geometrically or mechanically in series, the compound electrical consequence is that the resonant divider circuit of transformer 10' is effectively in shunt with its reactive load. It should be appreciated that FIG. 4 is a conceptual model which provides a framework for illustrating the favorable characteristics of RF transformer 10' even though in fact the transformer conductance need not be in parallel with the $C_A$ and $C_B$ capacitance. Accordingly, some design freedom can be used to alter the longitudinal distribution of transformer voltage.

In one embodiment of RF transformer 10', the transformer inductor 26 was formed from a single piece of copper wire having a length of 12 inches and a diameter of 0.035 inch. The region between elements 18 and 20 was occupied by a layer of "Teflon" material having a thickness of 0.700 inch. Strip 24 was also comprised of a "Teflon" material having a thickness of 0.250 inch, and the uniform distance between conductive elements 22 and 28 was 0.093 inch. Elements 18, 22, 24 and 28 were all between 0.700 and 0.805 inch in width, with strip 20 being 0.420 inch wide by 0.125 inch thick by 1.8 inches in length where operation near 144 MHz was intended.

With reference to the left hand portion of FIG. 4, which comprises equivalent electrical circuit 60 comprising elements $C_A$, $C_B$, L and $R_o$, the generally large value of equivalent shunt loss $R_o$ of the transformer inductance L is stepped down to a lower value by the capacitive divider of $C_A$ and $C_B$ with the step down ratio being proportional to:

$$\frac{C_B^2}{(C_A + C_B)^2}$$

This relationship is derived from the more complete expression for the transformer input impedance whose real ($R_e$) and reactive ($I_m$) components are:

$$R_e = \frac{R_o w^2 L(C_A + C_B)[w^2 LC_B - 1) - (w^2 LC_T - 1)]}{[w^2 L(C_A + C_B)]^2 + [R_o w(C_A + C_B)(w^2 LC_T - 1)]^2}$$

$$I_m = \frac{-(C_A + C_B)[wL(w^2 L) + wR_o^2(w^2 LC_B - 1)(w^2 LC_T - 1)}{[w^2 L(C_A + C_B)]^2 + [R_o w(C_A + C_B)(w^2 LC_T - 1)]^2}$$

and subject to the condition that the angular frequency $w = 2\pi f$ and that:

$$C_T = \frac{C_A C_B}{C_A + C_B}$$

Figure 5:
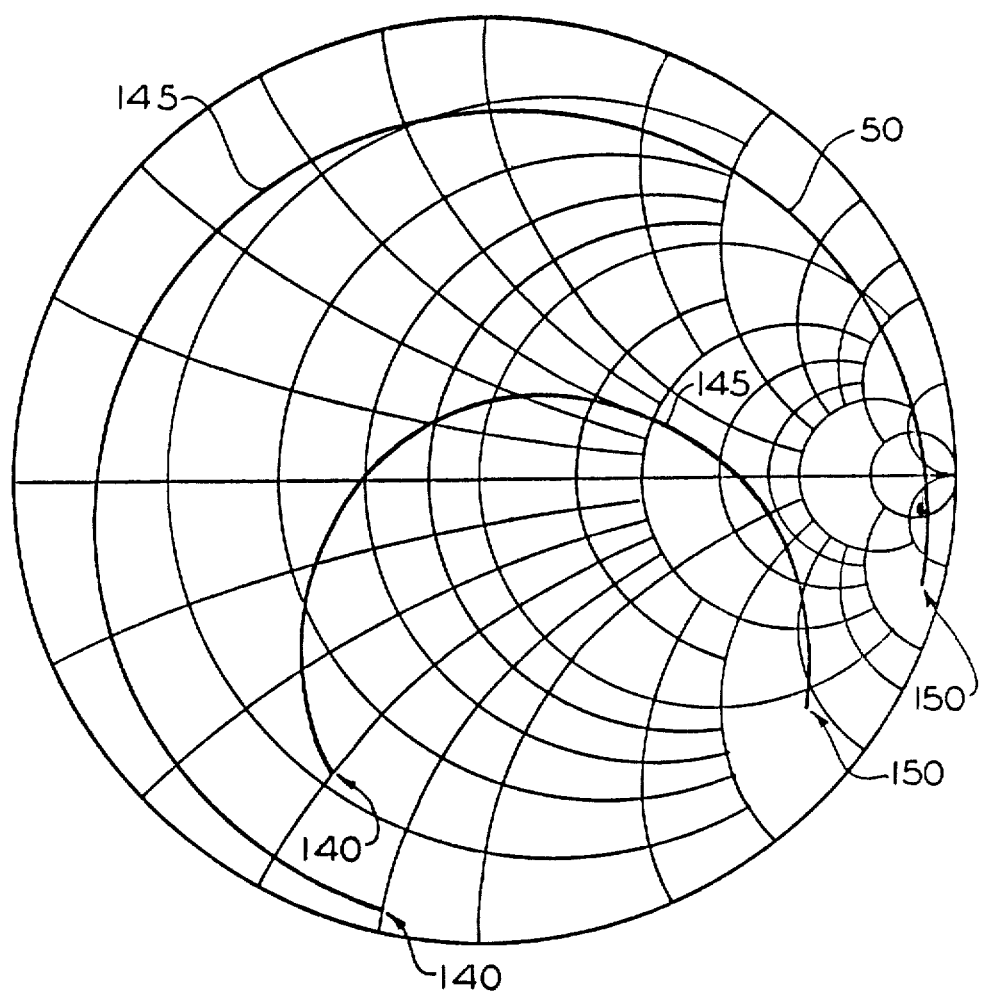
FIG. 5 is a graph illustrating the relationship between the measured input impedance and the input frequency of the circuit of FIG. 3.

In impedance coordinates, as represented in FIG. 5, the transformer input impedance locus of curve 50 is generated according to the transformer parameters identified above when $R_L$ is infinity and where the polar center for these coordinates has been normalized to 50 ohms. Curve 52 was generated when a non-inductive carbon resistor having a DC resistance of 5660 ohms was connected between elements 18 and 22 of the apparatus of FIG. 2, with both of curves 50 and 52 being resolved more fully with ten (10) one (1) MHz frequency markers over the frequency sweep of 140 MHz to 150 MHz.

In the unloaded transformer case, $R_o$ alone is the major component of circuit loss and transformer operation is described by assuming that the transformation ratio is not large enough to transform $R_o$, whose value has not yet been determined, down to 50 ohms. If this were desired $C_A$ would have to be increased, in which case the spacing between elements 18 and 20 of FIG. 2 would have to be made smaller. This might be accomplished, for example, by inverting the structure defined by elements 18, 20, 22, 24, and 26 as a whole unit. As described above, however, since the transformer ratio is not large enough to transform the large value of $R_o$ down to 50 ohms, the transformer parameters are evidently more appropriate to transforming a lower value of shunt loss to 50 ohms. Curve 52 of FIG. 5 was generated to illustrate this case by connecting the 5660 ohm resistor as described above.

It will be appreciated that the input impedance for the loaded transformer case can be represented as a near 50 ohm termination over the narrow frequency range between 143 MHz and 144 MHz. The percentage of incident power reflected from the transformer input port is very small in this frequency region and therefore a plot of the reflected power versus frequency between 143 MHz and 144 MHz can be conceptually envisioned as having a deep notch in this frequency interval. Clearly a slight increase in the load capacitance $C_L$ will displace this notch slightly lower in frequency. This may be accomplished by either slightly decreasing the actual spacing between element 22 and plate 28 or by locally decreasing the effective spacing between element 22 and plate 28 by inserting a small conducting perturbing object in the capacitor formed between element 22 and plate 28 to thereby locally displace stored energy in the electric field of $C_L$ from the volume of the conducting perturbing object.

For the case wherein the load resistance $R_L$ in equivalent circuit 60 represents an open circuit, three parameters which describe circuit 60 are the resonant frequency $f_O$, the circuit unloaded Q, $Q_0$, and the ratio of the equivalent shunt loss $R_O$ of the inductor $R_O$ to the circuit unloaded Q, $R_O/Q_O$. For the case wherein the load resistance $R_L$ of circuit 60 is other than an open circuit, three parameters which describe circuit 60 are $f_O$, the loaded circuit Q ($Q_L$), and the ratio of the total equivalent shunt loss $R_O$ to the circuit loaded Q, ($R_T/Q_L$), where the total equivalent shunt loss is the combination of $R_o$ and $R_e$ in parallel.

If a small conducting object is introduced into region 34 or the region between element 22 and plate 28 which defines the region of the load capacitance $C_L$, the conducting object slightly increases the electric field energy density by displacing the local electric field from the region of the load capacitance occupied by the conducting object. The resonant frequency at which the circuit input port has a local VSWR minimum will shift to a slightly lower resonant frequency corresponding to the local decrease in the effective spacing between element 22 and plate 28. If the region is free from any magnetic fields, the shift to the lower resonant frequency will not be accompanied by a compensating effect to a higher frequency due to a perturbation of the magnetic field. If the circuit electric field in the interior of the region of the load capacitance $C_L$ is large relative to the fringing circuit fields of the adjacent enclosure walls of housing 30 and if the electric field in the load capacitor region 34 is large relative to the electric field in the dielectric materials between the conductive surfaces of the transformer, the following relationship is applicable:

$$\frac{R_o}{Q_o} = \frac{-1\ K_2\ (S)^2\ df}{\pi\ e_o\ K_1\ (f_o)^2\ dv}$$

where:
S is the distance between the conducting elements 22 and 28 defining the load capacitance $C_L$;
$e_o$ is the permeability of the free space between elements 22 and 28;
$f_o$ is the circuit resonant frequency;
df is the measured frequency shift f the resonant frequency resulting from introduction of a small conducting object into region 34;
dv is the volume of the small conducting object introduced into the capacitance region;
$K_1$ is a constant which is a function of the shape of the perturbing object and the manner with which the object is aligned relative to the local electric field surrounding the object; and
$K_2$ is a constant, whose value is near unity if the gap of $C_L$ contains essentially all the circuit electric field.

If the perturbed region contains substantially all of the circuit electric field and if the perturbing object is a cylindrical member having a height which is much smaller than the distance S and the circular end of the object aligns normal to the electric field, $K_1/K_2$ approximates unity. In this approximation, because the distribution of the fields within the circuit does not depend on the circuit loss but rather on the geometry of the circuit, the measured frequency shift for both the loaded and unloaded cases is substantially the same.

The measured value of R/Q can be combined with the measured circuit Q to infer the output impedance level of the transformer 12 since the following relationship holds:

$$R = (R/Q)\ Q$$

For an RF transformer as illustrated in FIG. 2, three separate perturbing objects in the form of cylindrical brass buttons having a height H and a volume dv as set forth in Table 1 were introduced into the region 34 of the load capacitor. Region 34 had a uniform height of 0.093 inch, a width of 0.750 inch and a length of 2.5 inches.

TABLE 1

|  | H (inches) | dv (cubic millimeters) |
|---|---|---|
| OBJECT 1 | .031 | 68.7 |
| OBJECT 2 | .020 | 28.0 |
| OBJECT 3 | .020 | 18.8 |

The longitudinal axes of the brass objects were aligned normal to the parallel longitudinal axes of element 22 and plate 28. The observed frequency shifts and measured circuit Q for the three objects of Table 1 are set forth in Table 2 below for the case where equivalent circuit 60 is unloaded.

TABLE 2

| | $f_o$(MHz) | df(KHz) | R/Q(ohms) | Q | $R_0$(ohms) |
|---|---|---|---|---|---|
| OBJECT 1 | 145 | −1000 | 139.0 | 299.3 | 41,602 |
| OBJECT 2 | 145 | −400 | 136.4 | 299.3 | 40,824 |
| OBJECT 3 | 145 | −260 | 132.0 | 299.3 | 39,507 |

The frequency shifts and measured loaded circuit Q for the three objects of Table 1 are set forth in Table 3 below for the case wherein equivalent circuit 60 is loaded with 5,660 ohms.

TABLE 3

| | $f_o$(MHz) | df(KHz) | R/Q(ohms) | Q | $R_T$(ohms) |
|---|---|---|---|---|---|
| OBJECT 1 | 143.034 | −1000 | 142.7 | 45.1 | 6435 |
| OBJECT 2 | 143.034 | −380 | 133.0 | 45.1 | 5998 |
| OBJECT 3 | 143.034 | −250 | 130.3 | 45.1 | 5876 |

It should be appreciated that in the unloaded transformer case, the VSWR minimum is rather broad due to the mismatch accompanying the chosen transformer parameters and the large value of $R_o$. In such a case a nondescript matching network 70 as illustrated in FIG. 7 can be inserted between the sweep frequency RF source and the transformer to facilitate the resolution of the 260 KHz frequency shift caused by the 18.8 cubic mm perturbing object.

Several observations relative to the data of tables 1, 2 and 3 and the dependance of R/Q on the constants $K_1$ and $K_2$ should be made. One is that the frequency shifts of like objects is substantially the same in both the loaded and unloaded cases as expected. Another is that in the high resolution data of Table 3 the frequency shift per unit volume of perturbing object is substantially the same for the two objects of the same height but noticeably less for the object of larger height thus illustrating the role of $K_1$, $K_2$ and how large H should be relative to S.

For example, in a somewhat larger enclosure with ⅛ inch thick walls with outside dimensions of 4 inches wide by 4 inches high by 6 inches deep, a transformer was constructed with a 0.250 inch high output gap with a single transformer inductor made from a 5.25 inch length of ¼ inch diameter copper tubing. At a frequency of 223.10° MHz an unloaded Q of 851.3 was achieved, and with the perturbation technique using a 12.9 cubic millimeter button an R/Q of 163.9 was measured. When this circuit was loaded with a carbon resistor having a dc resistance of 15,200 ohms, the loaded Q and R/Q were respectively 96.0 and 163.9. The dc resistor therefore had a loading effect of 15,700 ohms, very close to the expected dc value of 15,200 ohms.

The transformer action is generated when the electric field of the transformer input and output are strongly coupled. The diagnostic technique associated with perturbing the internal fields of a transformer so constructed show that a detailed picture regarding the actual output impedance level of a transformer can be obtained. The RF transformer 12 is capable, for example, of developing a peak to peak RF voltage across the gap between element 22 and 28 in excess of 1,000 volts when a 20 watt RF source is applied to the input port across element 18 and 20.

In accordance with the invention, an electrically elongated RF transformer adapted to illustrate a useful geometry for a high power laser is generally designated in FIG. 6 by the numeral 80. A strip 82 of "Teflon" material is interposed between elements 22 and 28. Strip 82, in one reduction to practice, was 0.200 inch high by 0.900 inch wide by 21.625 inches long. A rectangular slot 84 is symmetrically machined along the longitudinal center line of strip 82. Slot 84 was 0.310 inch wide by 0.140 inch deep. A third strip 90 of "Teflon" material having a thickness of 0.750 inch maintains elements 20 and 22 in parallel spaced relationship. Inductors 92, 94, 96 and 98 are electrically connected between conductive elements 18 and 22. The foregoing inductors were constructed from a 0.050 inch diameter copper wire. The length 1 of each of the inductive wires in inches and the mean axial location Z from the end feed point in centimeters is set forth in Table 4 below.

TABLE 4

| | l (inches) | z (centimeters) |
|---|---|---|
| INDUCTOR 92 | 5.9 | 10 |
| INDUCTOR 94 | 8.4 | 11.5 |
| INDUCTOR 96 | 7.4 | 34 |
| INDUCTOR 98 | 7.9 | 48 |

With further reference to FIG. 6, it should be appreciated that the points of connection, the number of turns and the manner of connection, i.e., the orientation of the grounded end relative to the input port, may be varied for the inductors for each transformer configuration. In the disclosed embodiment the coordinates at which each of the inductors is connected to the element 18 is less than the corresponding coordinate at which each inductor is connected to element 22, i.e., there is a vertical offset of the connection points. It should be appreciated that the foregoing relationship may be reversed or alternated as desired to provide a predetermined voltage distribution corresponding to a preestablished inductance distribution. In practice, the drive frequency will be selected and the inductors fabricated. The inductors will then be connected with the initial connection points based upon prior experience. Next, the inductors will be varied to achieve the desired frequency, i.e., a network analyzer will be employed to see if the VSWR minimum is at the selected frequency and, if not, the inductors will be physically varied. Thereafter, the measuring technique of the present invention will be used to determine if the frequency shift along slot 84, i.e., $C_L$, is the same at all points. If the frequency shift is not substantially constant, the inductors will be altered and/or the points of connection of the inductors will be changed. The procedure is done repetitively until the desired results are achieved.

The internal fields of the transformer of FIG. 6 may be accessed by attaching a perturbing object (not illustrated) to a thin ten (10) lb. test monofilament fishing line and pulling the perturbing object through strip 82 along slot 84. For these measurements a cylindrical perturbing object of a height 0.032 inch and volume 39.0 cubic millimeters was used.

For one case, wherein strip 82 was removed to provide an air gap of 0.125 inch, a sharp VSWR minimum occurred at 138.900 MHz and an average frequency shift of 59 KHz was measured at several locations Z along the transformer structure yielding a $R_O/Q_O$ value of 28.4. With the slotted strip 82 in place as illustrated in FIG. 6, the VSWR minimum occurred at 148.600 MHz and an unloaded circuit $Q_O$ of 317.5 was measured. As the button traversed the axial slot 84, the average $R_O$ was determined to be approximately 9,200 ohms with an estimated uncertainty of plus or minus 15 percent.

Figure 8:
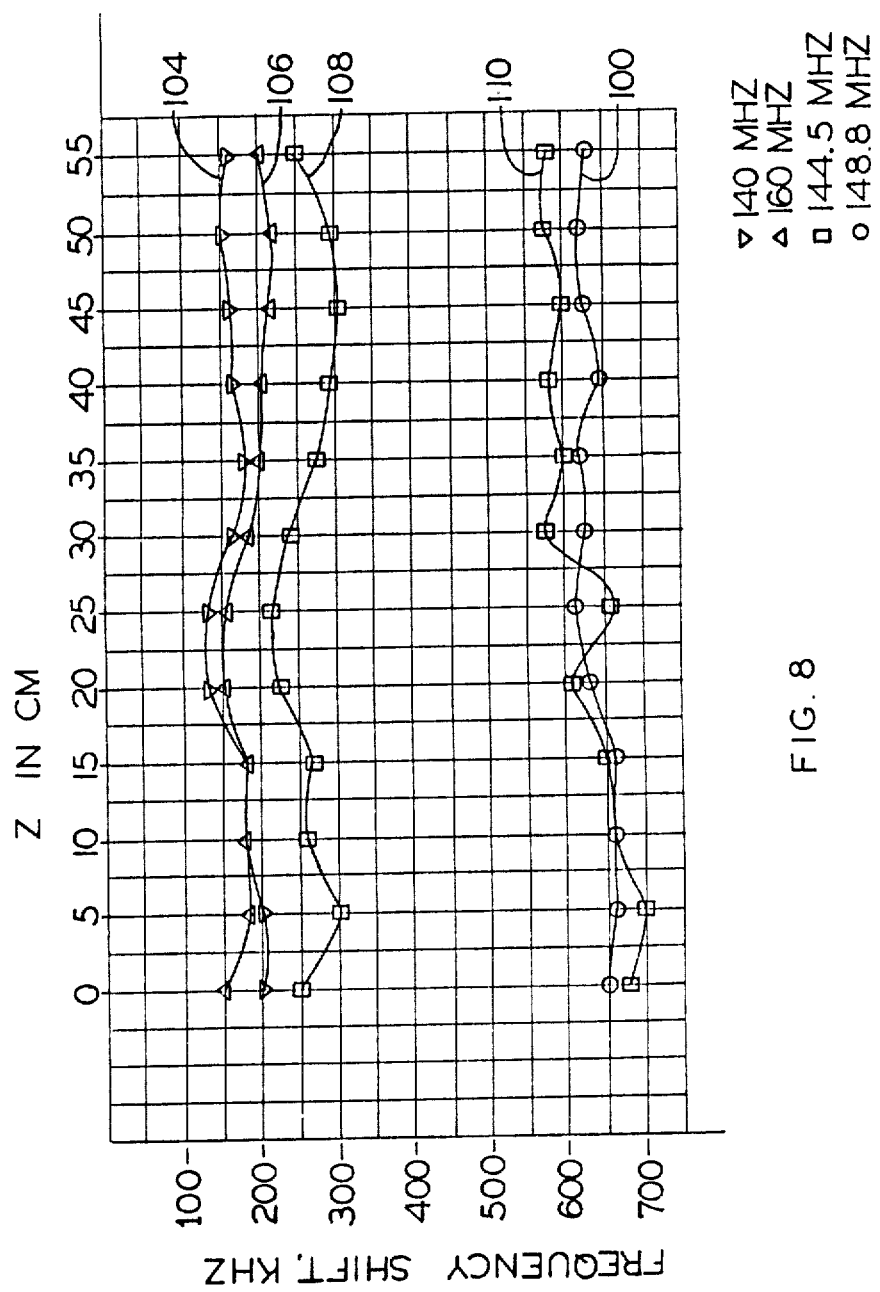
FIG. 8 is a graph illustrating the relative field distribution for the transformer of FIG. 6.

With reference to FIG. 8, a graphical representation of the negative frequency shift in KHz versus the distance along the axis Z in centimeters is illustrated. Curve 100 represents the frequency shift measurements at 5 centimeter intervals along the slot 84 for the perturbing button having a height of 0.032 inch and volume of 39.0 cubic millimeters. A VSWR minimum of 148.8 KHz was obtained. Curves 104, 106 and 108 illustrate the field uniformity for a larger rectangular perturbing object at a number of various frequencies. The use of a high power, 7 watt RF source whose frequency was turned to 144.5 MHz is specifically emphasized since VSWR minimums of 140, 160, and 144.5 MHz were obtained for curves 104, 106 and 108, respectively, using an external matching circuit such as circuit 70 to enhance the resolution of the VSWR minimum at the arbitrarily chosen frequencies in the region of interest.

Curve 110 of FIG. 8, illustrates the frequency shift versus the distance of the perturbing object along slot 84 for a case wherein transformer 80 is modified by reversing the coordinates of the points of connection of the inductors to elements 18 and 22.

Figure 9:
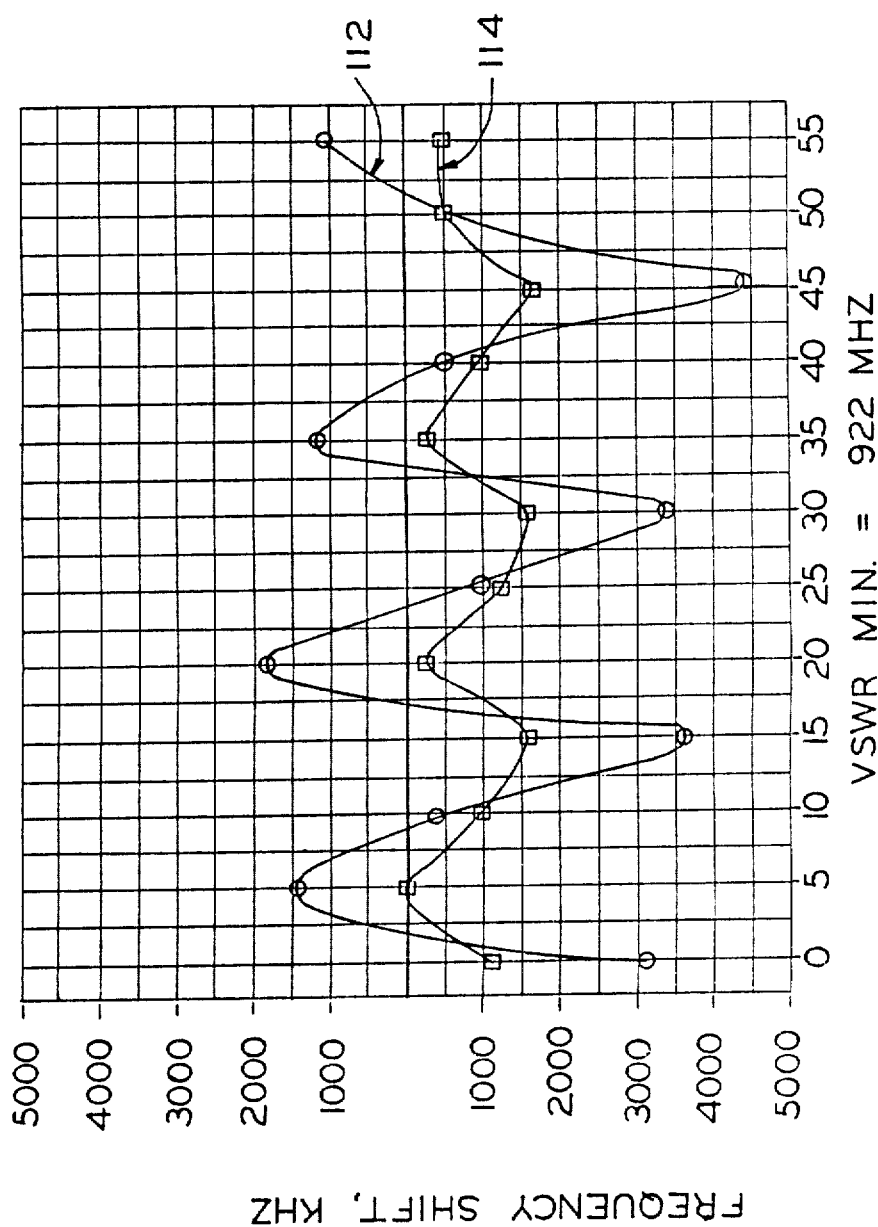
FIG. 9 is a graph illustrating another field distribution for the transformer of FIG. 6.

With regard to FIG. 9, curve 112 is a plot of frequency shift versus the distance along slot 84 for a naturally occurring VSWR minimum at 922 MHz for a metal perturbing object. Curve 114 is a similar plot for a ceramic perturbing object. The foregoing data illustrates that the positive frequency shifts are to the magnetic fields since the insulator of curve 114 perturbs only stored energy in the electric field.

The data of FIG. 9 was taken without using an impedance matching circuit between the RF source and the RF transformer. The data represented curves 104, 106 and 108 of FIG. 8 was obtained using a circuit such as that of FIG. 7. The FIG. 9 data illustrates that if a transversely excited gas discharge circuit has a naturally occurring VSWR minimum at a frequency of interest, then detailed internal field information is obtained by measuring the shift in the VSWR minimum associated with introducing a perturbing object into the capacitive space where the discharge is desired. The curve 106 of FIG. 8 indicates that even if the probing frequency of 160 MHz is not coincident with the frequency of the naturally occurring VSWR minimum at 148.8 MHz, the shift in VSWR minimum caused by the perturbing object can be resolved if an external matching circuit is used. When an external circuit is used even for a high, i.e., Q $Q_o$=317.5, discharge circuit far removed from its naturally occurring VSWR minimum, the measured spatial variation of frequency is preserved although the observed frequency shift is diminished. Thus when only relative field information is desired an external circuit can be used to generate a notch sufficiently deep to resolve the frequency shift of small perturbing objects as long as the induced frequency shift due to the small object is small relative to the bandwidth of the external circuit.

The clear utility of the perturbation technique is that there are several related methods which can be used to extract relative information regarding the internal fields of a laser without physically or mechanically altering the structure. From an electrical standpoint it can be appreciated that no secondary effects or secondary corrections due to the introduction of either a voltage or current probe need to be taken into account.

The data of curve 108 of FIG. 8 indicates that even a higher power RF source, such as the discharge excitation source itself, can be employed for this purpose. When the technique is employed in detail, absolute information regarding the actual output impedance level of various transformer circuits is obtainable up to output levels of several thousand ohms.

In accordance with the present invention, the elongated transformer of FIG. 6 enclosed in the housing of FIG. 2 had the following characteristics when adapted as a $CO_2$ laser. Element 28 was of aluminum 0.625 inch wide by 0.500 inch high by 36.7 cm long; element 82 was made from two identical alumina strips 0.950 inch wide by 0.196 inch high by 38 cm long, each of which had a semicircular groove (84) of 0.250 inch in width ground along the longitudinal centerline thereof so that a cylindrical gas discharge volume was defined; element 22 was of aluminum 0.625 inch wide by 0.250 inch high by 36.7 cm long; element 90 was of alumina 0.625 inch wide by 0.525 inch high by 38 cm long, with 28 each 0.094 inch holes therein to allow passage of the wire for the transformer inductances; element 20 was a 0.020 inch thick brass sheet 0.400 inch wide by 36 cm long; element 88 electrically was a "Teflon" spacer 0.400 inch wide by 0.225 inch high by 36 cm long with a 0.225 inch high by 0.625 inch wide by 38 cm long alumina "window frame" holder; and element 18 was an alumina piece 0.625 inch wide by 0.245 inch high by 38 cm long. The elongated housing of FIG. 2 was 41.6 cm in overall length and for operation near 146 MHz, the inductors were as described in Table 5.

TABLE 5

|  | l (inches) | z (centimeters) | wire diameter |
|---|---|---|---|
| INDUCTOR 92 | 5.9 | 3.0 | .032 |
| INDUCTOR 94 | 7.8 | 10.0 | .032 |
| INDUCTOR 96 | 5.5 | 16.5 | .032 |
| INDUCTOR 98 | 5.5 | 26.0 | .032 |
| INDUCTOR 100 | 4.6 | 32.0 | .048 |

Operating as a $CO_2$ laser, the 37 cm long by 6.35 mm diameter gain medium was generated by pumping a 1-1-6:$CO_2$-Air-He gas mix at a pressure of approximately 25 Torr with 170 watts of RF at a frequency of 146.520 MHz. The optical cavity formed by a plano 95% reflecting ZnSe output coupler and a plano maximum reflectivity compressed silicon mirror generated a multi-mode output pattern characteristic of an optical resonator with a Fresnel number of 1.9.

Figure 10:
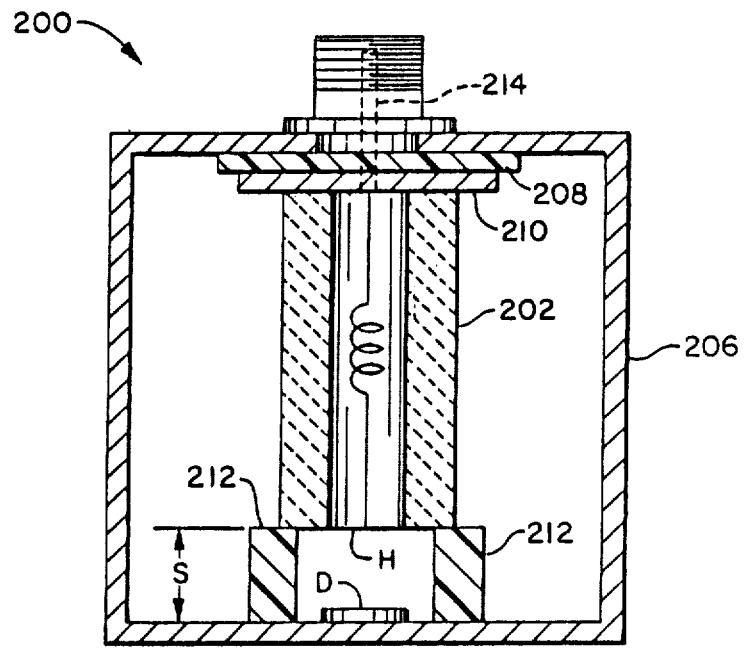
FIG. 10 is cross-sectional view, partly in schematic of a fourth embodiment of an RF transformer in accordance with the present invention, the transformer of FIG. 10 incorporating a microwave clamp-on type circuit and a test object.
Figure 11:
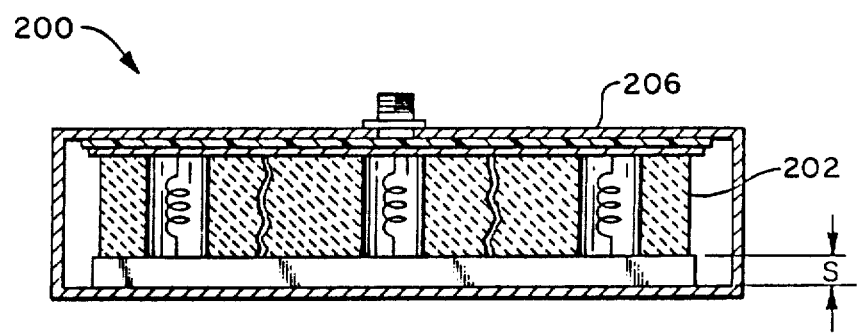
FIG. 11 is a reduced longitudinal sectional view, partly in schematic, of the transformer of FIG. 10.

With reference to FIGS. 10 and 11, transformer 200 incorporates an L Band microwave circuit which is adapted to clamp on to a gas laser as further described herein. In one reduction to practice, a low inductance distributed bar inductor 202 had dimensions, e.g. 1 inch by 2 inches by 10.25 inches, selected to provide a frequency of operation near the desired ISM band center frequency of 915 MHz. The transformer housing 206 was formed from a 3 inch O.D. square extruded aluminum rectangular box which extended longitudinally (through the plane of FIG. 10) approximately 12 inches and had a wall thickness on the order of an eighth of an inch. The input capacitance to the transformer 200 was defined by a "Teflon" strip 208 positioned between the wall of the housing 206 and an aluminum strip 210 which was approximately 0.125 inch by 1.5 inches by 10.75 inches. In a first trial (Trial 1), strip 208 had dimensions of 0.100 by 1.75 by 11 inches. In a second trial (Trial 2), the strip 208 had dimensions of 0.065 inch by 1.75 inches by 11 inches. "Teflon" spacers 212 were disposed between the bar inductor 202 and the wall enclosure to define a gap S. The effective conducting plane or "hot electrode" location defining one boundary of gap S is generally designated by H. An RF oscillator (not illustrated) supplied power via a type N coaxial bulkhead connector 214 whose inner conductor is electrically connected to conductive element 210 in a manner similar to that previously described relative to transformer 10.

Two embodiments of a test metallic disc D denoted as OBJECT 4 and OBJECT 5 were introduced into the air gap S of the transformer output capacitance. The dimensions of the test objects are described in TABLE 6.

TABLE 6

|  | H (inches) | dv (cubic millimeters) |
|---|---|---|
| OBJECT 4 | .080 | 325 |
| OBJECT 5 | .077 | 690 |

Perturbation tests were undertaken in various embodiments of transformer 200. In Trial 1 the gap S was 0.515 inch; in Trial 2 the air gap S was 0.556 inch. The downward frequency shift caused by introducing metallic disc D is illustrated in TABLE 7.

TABLE 7

|  |  | fo(MHz) | df(MHz) | S(inches) | R/Q | Q | R(ohms) |
|---|---|---|---|---|---|---|---|
| OBJECT 4 | (Trial 1) | 917.5 | −.7 | .515 | >21.3 | 184 | >3919 |
| 4 | (Trial 2) | 920.0 | −.7 | .556 | >23.2 | 328 | >7609 |
| 5 |  | 44.5793 | −.025 | .777 | 243.3 | 50.6 | 12308 |

Figure 12:
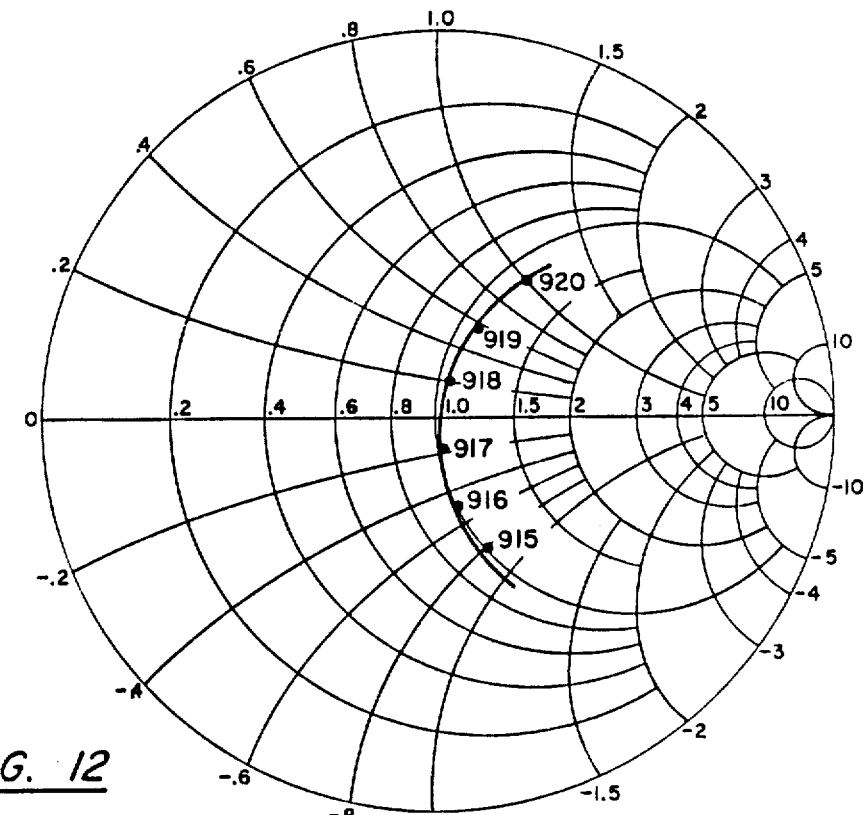
FIG. 12 is a graph illustrating a relationship between the measured input impedance and the input frequency for the transformer of FIG. 10.

The input impedance measurement for Trial 1 at a center frequency of 917.5 Mhz is illustrated in the graph of FIG. 12. In Trial 1 the "Teflon" strip 208 defining the input capacitance had a 0.100 inch thickness.

Figure 13:
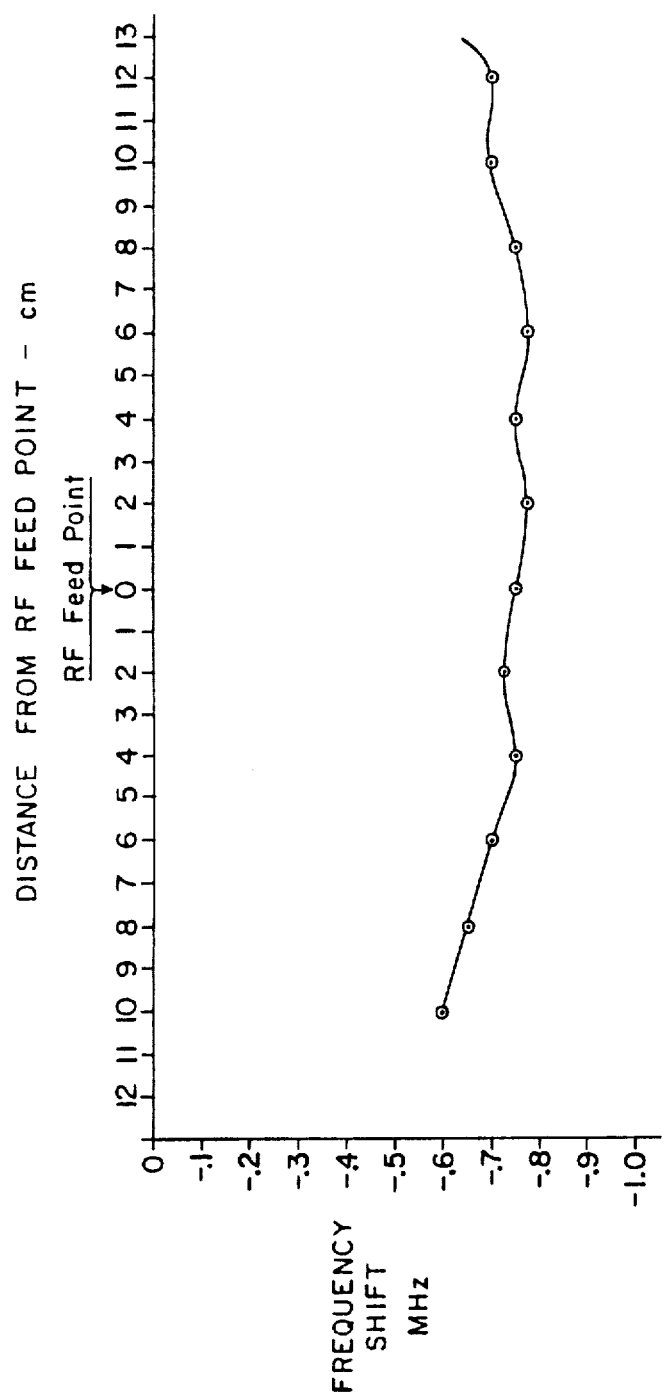
FIG. 13 is a graph illustrating the relative field distribution for the transformer of FIG. 10.

For Trial 2 the transformer 200 was subsequently disassembled and the housing 208 and the interior components were cleaned. The transformer was re-assembled. Upon re-assembly, the transformer input capacitor strip 208 was changed to a thickness of 0.065 inch. A second set of circuit measurements were undertaken. The frequency shift caused by the perturbing object D at various locations in the 0.556 inch air gap S, i.e. output capacitance, is graphically illustrated in FIG. 13. The Figure 13 graph illustrates that even though the region (gap S) of the transformer 200 where a laser gas discharge tube would be located is about 0.75 wavelengths long at the operating frequency of 920 Mhz, the RF field is generally uniform.

After the transformer components and the housing were cleaned, the measured unloaded Q increased thereby indicating that the effective circuit $R_o$ had apparently increased. Consequently, the thinner "Teflon" strip 208 was employed to increase the effective transformer ratio in order to restore the transformer input impedance to very near 50 ohms. The values of R/Q and $R_o$ for Trial 1 and Trial 2 entered in TABLE 7 are approximate values, since a significant portion of the total circuit electric field is located outside the gap S, i.e., between the bar inductor sides and the side walls of the transformer housing 206. Perturbing the fields in these regions with the object D indicated that the electric fields gradually diminished to zero at the approximate midpoint of the interior housing wall at which point the frequency shift became positive to indicate a region where the circuit magnetic field was increasing.

Transformer 200 is configured such that the transformer can be suitably employed with a gas laser by positioning a sealed elongated non-conductive tube containing the appropriate mixture and pressure of laser gases into the region of the transformer air gap S. Laser mirrors (not illustrated) or Brewster windows (not illustrated) may be placed at either end of the non-conducting laser tube envelope to complete the vacuum seal in accordance with techniques known to those skilled in gas laser arts.

For the described embodiment of transformer 200, the introduction of a ceramic or glass tube into the transformer air gap S generally lowers the frequency at which the input impedance approaches 50 ohms. Therefore, modifications to either the transformer housing 206 or the dimensions of bar inductor 202 are required in order to restore the operating frequency to 915 Mhz to provide desirable operation at the ISM frequency. Since the discharge impedance of a transversely pumped RF gas laser is much lower than the approximate values determined for $R_o$ in TABLE 7, the transformer input capacitance, e.g., "Teflon" spacer 208, requires corresponding modification, typically to lower the input capacitance as the gas load impedance becomes lower. As indicated in TABLE 7, a 0.065 inch thick "Teflon" strip 208 is appropriate if the combined circuit loss and gas discharge impedance approaches 7600 ohms. For lower combined gas and circuit impedances which approach 3900 ohms, a thicker strip 208, e.g., lower capacitance, should be used if the RF power is to be effectively delivered to a gas laser device positioned in gap S.

Figure 14:
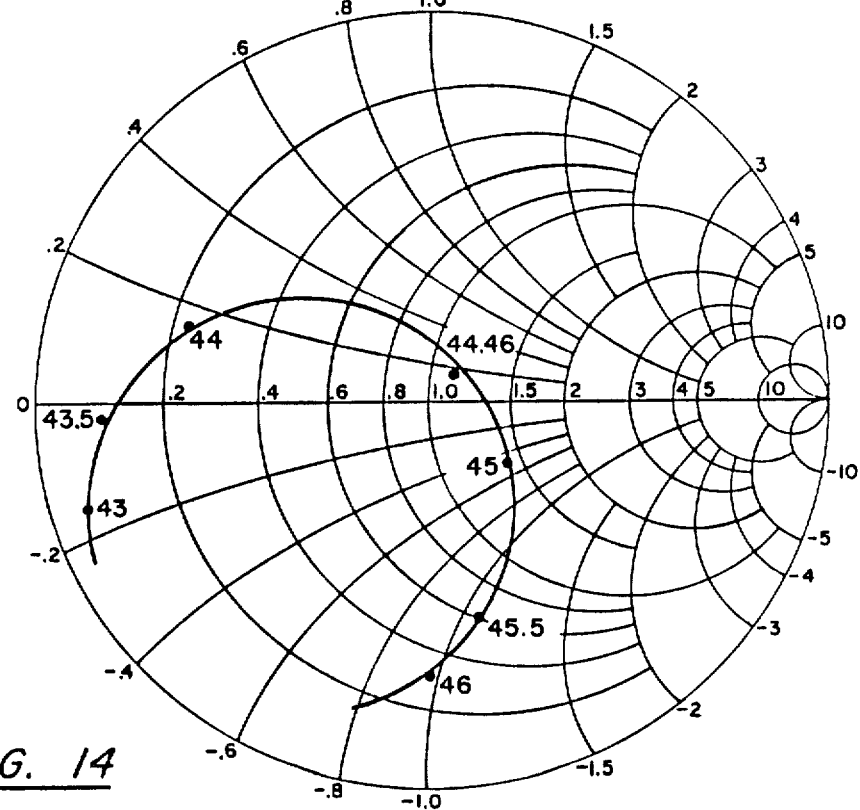
FIG. 14 is a graph illustrating the relationship between the measured input impedance and the input frequency for an embodiment of the transformer of FIG. 10.

The versatility of transformer 200 is illustrated in FIG. 14. FIG. 14 is a graph of circuit input impedance versus frequency for transformer 200 employing a 0.065 inch thick "Teflon" spacer 208. The bar inductor 202 was also replaced by a conventional inductor located midway along the 26 cm active circuit length and with the gap S increased to 0.777 inch. The inductor coil (not illustrated) was made from a 25 inch length of 0.035 inch diameter copper wire and wound on a ½ inch diameter by 1 inch long ceramic cylinder to form 13 ½ turns. A 15,000 ohm 2 watt carbon resistor was placed in parallel with the coil. Such a circuit could be employed to energize a quartz or other insulating laser gas discharge tube if inserted into the 0.777 inch gap S as described above for the microwave version of the transformer. The introduction of a ceramic or quartz tube into gap S will ordinarily lower the frequency at which the circuit input impedance displays a VSWR minimum. Thus, if operation in the 40 Mhz ISM band is desired, modification of the inductor will be required to suitably compensate for the corresponding reduction in circuit frequency caused by the introduction of the laser tube. Since the typical gas discharge impedance of many lasers is significantly lower than the measured 12,308 ohm value, the "Teflon" spacer dimensions will have to be modified accordingly so that the RF power will be effectively delivered to the pre-determined gas impedance level.

For example, when the 15,000 ohm resistor shunting the 13 ½ turn coil is removed, the transformer input impedance increases to approximately 300 ohms to thereby indicate that the residual shunt loss $R_o$ of the resulting circuit is approximately 75K ohms. This latter residual shunt loss can be confirmed by noting that the 15K ohm resistor and 75K ohms of inherent circuit loss in parallel yield a value close to the value computed from the R/Q and Q measurement of 12,308 ohms. Therefore, if a gas discharge impedance level of 15K ohms were expected, approximately 83% of the power delivered to the transformer circuit would be delivered to the 15K ohm gas load, while 17% would be dissipated in the circuit loss $R_o$. If a lower gas discharge impedance is expected, then the "Teflon" spacer strip 208 would have to be modified to provide a lower input capacitance in order to effect a satisfactory impedance match between the 50 ohm RF input port and the desired or expected $R_o$, gas load combination.

Figure 15:
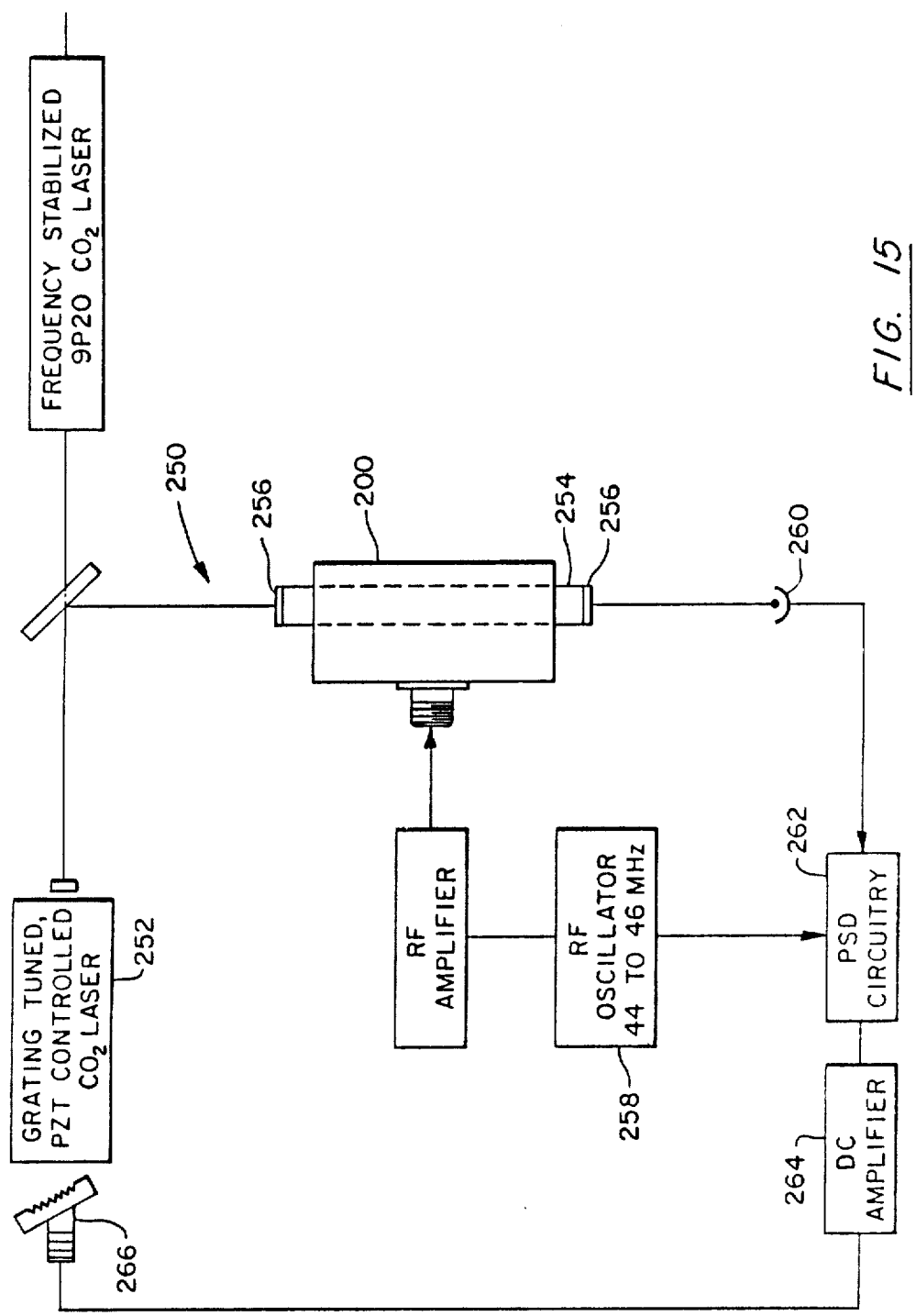
FIG. 15 is a schematic diagram of a laser modulation system wherein an RF transformer in accordance with the present invention is employed as an RF Stark effect modulator for the frequency stabilization of a laser.

In addition to transformer 200 having application as a device for energizing gas discharges at the 40 Mhz ISM band, the described transformer may also be employed to modulate a gas laser. A tube containing a gas having an absorption feature or absorbing transition frequency which is close to a given laser emission frequency may be positioned in gap S. A block diagram illustrating a modulator system 250 which may be employed to stabilize the frequency of a $CO_2$ laser 252 is illustrated in FIG. 15. For purposes of describing the invention, a specific $CO_2$ transition, 9P20, and a specific Stark active gas, methyl fluoride ($CH_3F$), will be discussed. However, numerous other gasses are appropriate for the 9P20 $CO_2$ transition as well as all the other oscillating $CO_2$ transitions in the 9 to 11 micron spectral region.

In a manner previously described for the transverse excitation of a laser gas, a sealed ceramic or glass tube or cell 254 having an outside diameter of less than the 0.777 inch gap S of an embodiment of transformer 200 and a convenient length of 30 cm is inserted into the gap S of the transformer. Upon insertion of the tube 254 into the transformer 200, the frequency at which the circuit VSWR minimum occurs will shift lower. Consequently, the described 13 ½ turn inductor wound on the ½ inch diameter by 1 inch ceramic coil form as described would require modification to reestablish the operation at 40 MHz. The tube 254 may have a pair of anti-reflection coated windows 256 or uncoated Brewster windows at each end to complete the vacuum envelope in accordance with teachings known to those skilled in gas laser arts. Depending on the desired absorption, modulation depth and degree of laser frequency stability desired, the gas tube is evacuated and refilled with $CH_3F$ at a low pressure, e.g., typically in the range of a few mTorr to 100 mTorr pressure.

Methyl fluoride is known to have an absorbing transition for 9P20 laser light approximately 45 MHz higher than the 9P20 transition center frequency. (DeTemple and Danielewicz, IEEE Journal of Quantum Electronics Vol. QE-12, No. 1, Jan. 1976, pp. 40–47, at p. 43). Thus, if 9P20 laser radiation is passed through a cell containing even a low pressure of $CH_3F$, some laser light will be absorbed by the $CH_3F$ transition of interest. A 45 MHz RF signal source 258 applied between the two parallel conducting surfaces of the transformer gap S, between which the $CH_3F$ cell 254 is situated, will not only increase the absorption as noted by Skatrud and Delucia, Optics Letters, Vol. 10, No. 5, May 1985, pp. 215–217), but will also maximize when the RF source frequency applied to the cell coincides with the frequency separating the 9P20 laser frequency and the $CH_3F$ absorption frequency. If the RF signal applied to the transformer containing the $CH_3F$ cell is derived from a reference oscillator 258 and swept from 44 to 46 MHz at a convenient sweep rate, e.g. typically 1 KHz, the 9P20 laser light passing through the cell of FIG. 15 will be amplitude modulated at the 1 KHz sweep rate. The foregoing amplitude modulation can be detected using a detector 260 and a common phase sensitive detection circuit 262 locked to the sweep rate of the reference RF generator 258. The detected signal is then applied via a DC amplifier 264 to the piezoelectric transducer 266 on the grating controlled $CO_2$ laser 252 to push the laser frequency higher or lower so that the maximum amplitude modulation depth on the detected laser signal occurs at the center of the RF sweep. If the center frequency of the swept RF signal source 258 is at 45 MHz, then the phase of the detected amplitude modulation will be zero relative to the phase of the swept source rate when the laser frequency and the $CH_3F$ transition frequency are separated exactly by 45 MHz, or approximately when the 9P20 laser is operating at line center.

If desired, other offset frequencies could be selected by appropriately shifting the center frequency of the swept RF source 258 and either shifting the transformer central response frequency or broadening the transformer response by reducing the value of the resistor which shunts the inductance of the transformer 200.

Since gas breakdown in the low pressure gas cell 254 is to be avoided, the RF field developed in the transformer gap S must be less than the field required to cause gas breakdown. For example, if 10 watts of 45 MHz RF power were applied to the transformer 200 of FIG. 15, a peak RF field of approximately 491 volts or about 249 volts per cm could be developed in the gap S and a $CH_3F$ pressure sufficiently low to prevent gas breakdown would be required. Since the $CH_3F$ absorption profile is pressure dependant, even a moderately short length of cell 254 in conjunction with the phase sensitive detection will yield detection signal to noise ratios that will permit locking the 9P20 laser output to a very narrow frequency range. Although 9P20 and $CH_3F$ have been employed to describe the application of the transformer as a Stark modulator, many gasses such as $CH_3CHF_2$, $CH_3CF_3$, $C_2HCl_3$, $NH_3$, $NH_2D$, etc., are Stark active and have a very rich RF-IR absorption spectra that can be employed to modulate virtually any desired $CO_2$ laser transition. (Jensen and Tobin IEEE Journal of Quantum Electronics, Vol. QE-8 No. 2, Feb. 1972, pp. 34–38).

A transformer 300 which is applicable for use with an interdigitated longitudinal RF excitation system is illustrated in FIGS. 16 and 17. The transformer 300 is particularly useful for operation in systems wherein high power, low pressure, low efficiency laser devices could benefit from the higher voltage-higher impedance operation as compared to that developed in a conventional transverse discharge arrangement.

The housing 302 exteriorly mounts an RF connector 303 which electrically communicates with an enclosed metal plate 304. The metal RF connection plate 304 is interposed between dielectric spacers 306 and 308. Opposed "hot" electrode 310 and grounded electrode 312 are concavely contoured to fit over a longitudinally extending dielectric vacuum envelope 314 for containing the gas discharge (not illustrated). The electrodes 310 and 312 have alternating, longitudinally spaced, transversely extending plates 311 and 313, respectively. The discharge itself would be generated in the envelope and disposed between the grounded electrode 312 and the hot electrode 30. A central resonator optical axis A traverses the envelope. The circuit inductance provided by inductor 320 cooperates with the input and load capacitance to produce the gas discharge voltage Vg between the plates 311 and S13 as schematically illustrated in FIG. 16.

Another embodiment of a transformer 350 for a transverse RF excitation system is illustrated in FIGS. 18, 19, 20 and 21. The circuit inductors 352 are physically positioned to provide a relatively compact profile for the exterior transformer housing 354. The "hot" electrode 356 and the grounded electrode 358 have opposing faces which are contoured similar to described electrodes 310 and 312, respectively. A dielectic vacuum envelope 360 defines the active region R. The envelope 360 is positioned between the contoured electrodes. The transformer housing 354 has a removable side plate 362 to provide access to the circuitry. The housing also has a removable end plate 364. Ceramic spacers 366 are interposed between the contoured electrode 356 and a metal spacer element 368 which electrically connects with the RF connector 370.

Figure 18:
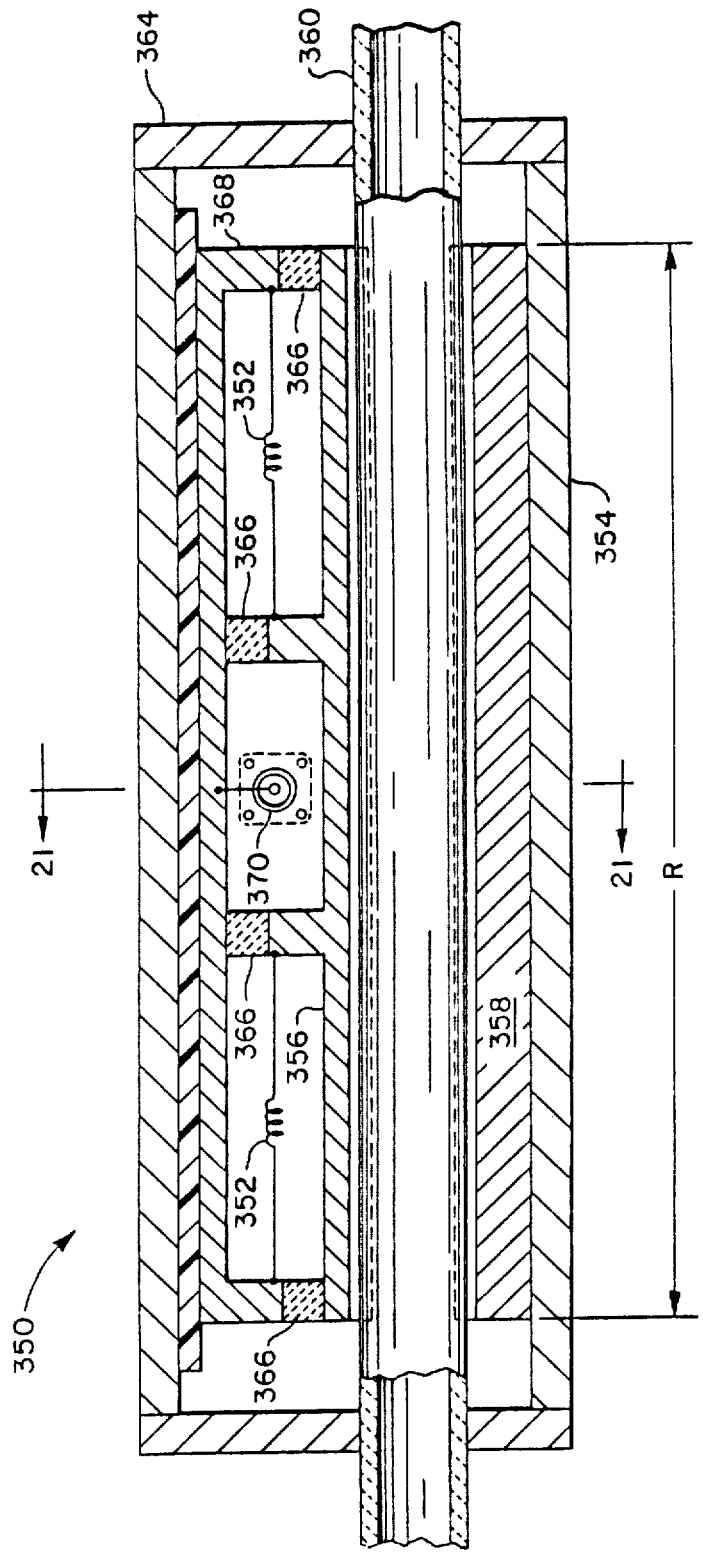
FIG. 18 is a longitudinal sectional view, partly in schematic, of a sixth embodiment of an RF transformer in accordance with the present invention, the transformer of FIG. 18 incorporating a compact external clamp-on type circuit.
Figure 21:
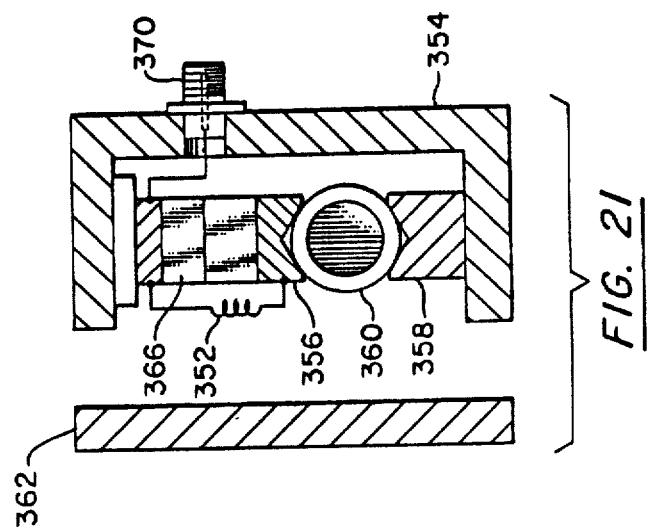
FIG. 21 is an exploded sectional view, partly in schematic, taken along the line 21—21 of FIG. 18.
Figure 20:
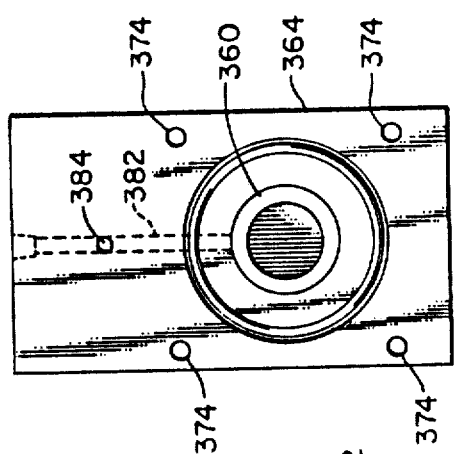
FIG. 20 is an end view, partly in phantom, of the assembly of FIG. 19.
Figure 19:
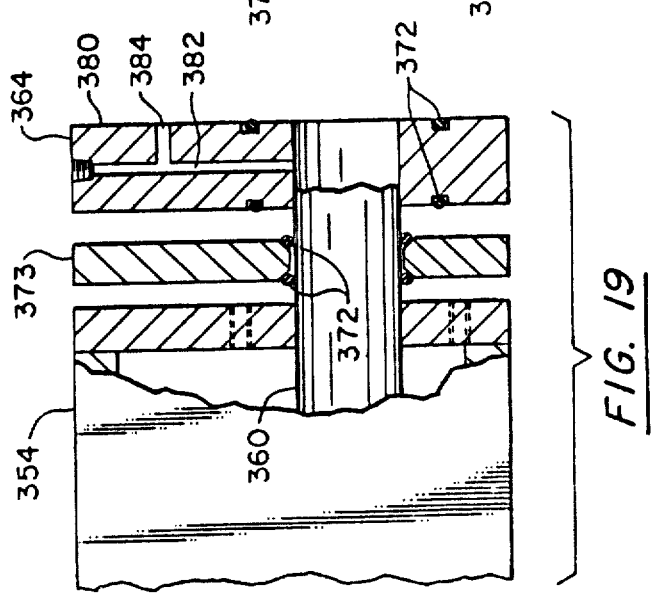
FIG. 19 is a fragmentary enlarged exploded sectional view of an assembly adapted for the transformer of FIG. 18.

With reference to FIGS. 19 and 20, the dielectric vacuum envelope 360 employs O-rings 372 to maintain the vacuum interior to the dielectric tube. Openings 374 are machined in the end plates 376 for receiving screws (not illustrated) to sealingly compress the O-rings 372 between seal plate 373 and the outer surface of the discharge tube. The end plate also defines a mirror-holding mounting surface 380. Perpendicular bores 382 and 384 through the end plate 376 define a gas evacuation and gas fill passage. The foregoing transformer 350 essentially functions as a compact external clamp-on type circuit for a received dielectric discharge tube. It will be understood that FIG. 21 shows inductor 352 schematically, i.e., the inductors are not physically located as indicated in FIG. 21 but rather are positioned as depicted in FIG. 18.

Another embodiment of a transformer 400 in the form of an external clamp-on type circuit is illustrated in FIGS. 22 and 23. Transformer 400 is constructed with a 4 ½ inch square cross-sectional housing 402 and is suitably dimensioned to be clamped about a 0.75 inch outside diameter "pyrex" tube 404. The tube diameter is sufficiently large to exhibit a low pressure drop to a flowing mixture of laser gasses in a high power, fast axial flow $CO_2$ laser. The transformer 400 employs a removable top 406. The quartz or ceramic vacuum envelope 410 is formed between contoured electrodes 412 and 414. Wire inductors 416 wound on dielectric coil forms are connected between metal plates 418 and 420 with the RF input 422 being applied to conducting plane 420. The transformer 400 is configured to accomodate a dielectric vacuum region 424 which may contain a non-flowing laser gas mix, a Stark active gas or flowing laser gas mix. A simplified schematic circuit diagram 426 for transformer 400 is illustrated in FIG. 24.

Figure 26:
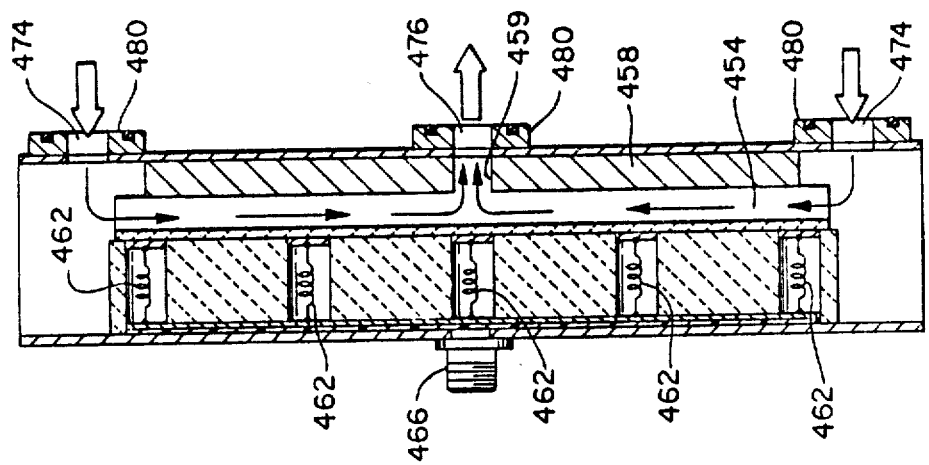
FIG. 26 is a fragmentary interior top sectional view, partly in schematic, of the transformer of FIG. 25 further illustrating the laser gas flow path through a discharge region of the transformer.
Figure 25:
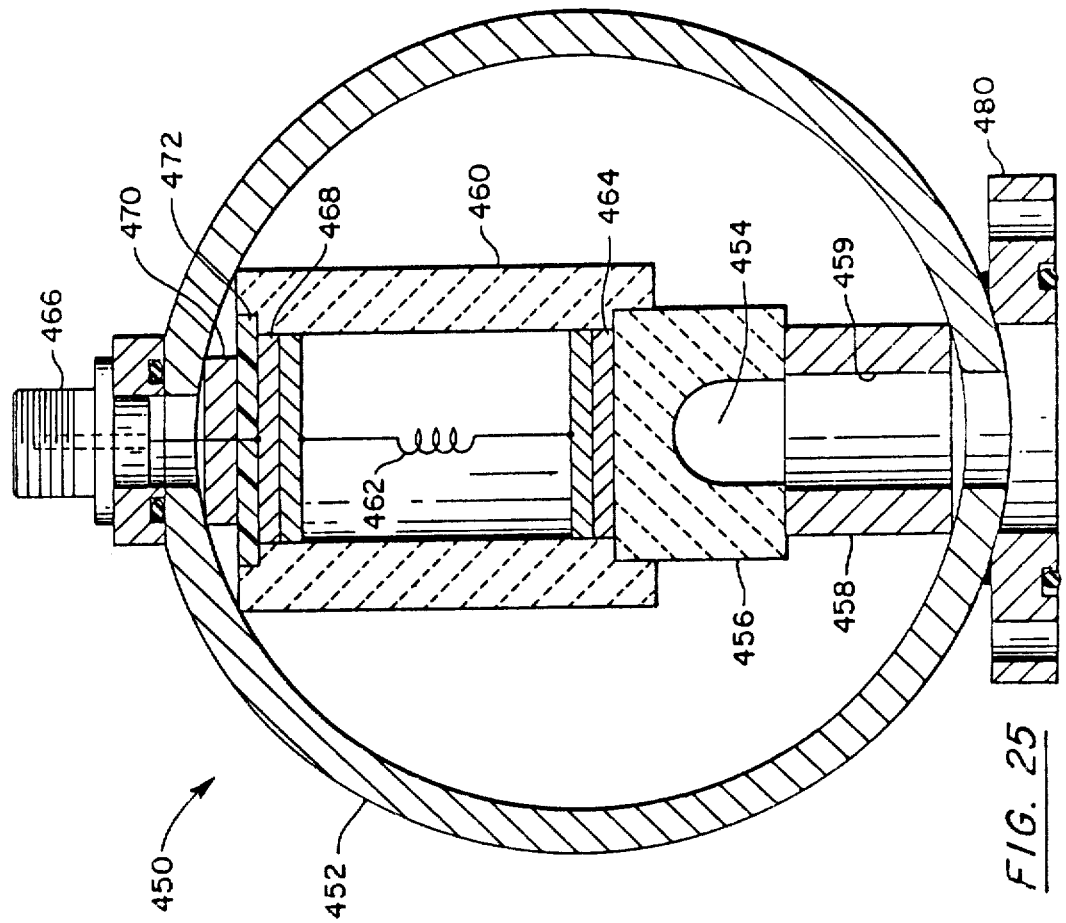
FIG. 25 is a cross-sectional view, partly in schematic, of an eighth embodiment of an RF transformer in accordance with the present invention.

A transformer 450 which is totally enclosed in a cylindrical aluminum housing 452 is illustrated in FIGS. 25 and 26. In one example, the extruded aluminum housing 452 has an outside diameter of 5 inches. A gas discharge region 454 approximately ⅜ inch in diameter is formed by machining an elongated ceramic block 456. The ceramic block 456 is mounted against a metal spacer/ground electrode 458 having a diametral opening 459. One face (lower) of electrode 458 abuts the interior walls of the cylindrical housing 452. An insulator 460 surrounds an inductor coil 462 in generally perpendicular relationship with block 45 and electrode 458. A metallic plate electrode 464 engages against the top surface of the ceramic block 456. An RF connector 466 is exteriorly mounted at the housing and sealed by O-rings 468 to maintain the integrity of the vacuum envelope. The RF connector 466 provides electrical communication with a metal connection strip 468. A dielectric spacer 472 is interposed between connection strip 468 and a metal spacer plate 470 which engages the interior wall of the housing.

FIG. 26 illustrates one possible gas flow path through a $CO_2$ laser employed with transformer 450. The cooled laser gas enters at longitudinally spaced inlet ports 474 and the hot gasses flow out of the central outlet port 476. Flanges 480 for the gas blower lines extend from the exterior of the housing 452. Transformer 450 was employed in a $CO_2$ laser having a sealed off gain length of 55 cm operating with 25 Torr mixture of $CO_2$-$N_2$-He: 1-2-4. An average output power of 30 watts was observed when the laser was energized with a 315 watts average power, 27.12 MHz RF source. A longer ISS CM sealed-off gain length produced an output power of 120 watts when energized with nominal 900 watt 10 millisecond long RF pulses.

Because transformer 450 is configured such that the RF discharge is directly in contact with the grounded metal RF electrode 458, laser operation for an initial time interval of many minutes is possible using only natural convective cooling to the outer surface of the metal vacuum envelope defining housing 452. For laser operation at the 1000 watt cw or higher power level, intravacuum laser gas flow can be introduced as shown in FIG. 26 using a Roots-type high pressure ratio gas blower (not illustrated). The hot laser gasses may be evacuated from the discharge region (in the direction of the arrows) through the opening 459 in the grounded electrode 458 and the metal vacuum envelope outlet port 476 located midway between the discharge inlet ports 474. The typical gas flow loop traverses a Roots-type blower/heat exchanger (not illustrated), with the cooled laser gases being reintroduced to the laser discharge head vacuum envelope at both ends of the elongated ceramic discharge block 456. The flowing gas path may be constructed employing known technology familiar to those skilled in the art of close cycle convection cooled $CO_2$ lasers. Exclusive of the closed cycle gas blower circuit and RF power supply, a 1000 to 2000 watt cw $CO_2$ laser constructed as shown in FIG. 25 may have an inside diameter of 5 inches or less, a length of 48 inches and weigh less than 100 pounds. The intravacuum part count of such a laser could be as low as twenty and accomplished with fewer than ten O-ring seals, compared with contemporary commercially available devices that can weigh in excess of 500 pounds and have hundreds of parts and O-ring seals.

Figure 28:
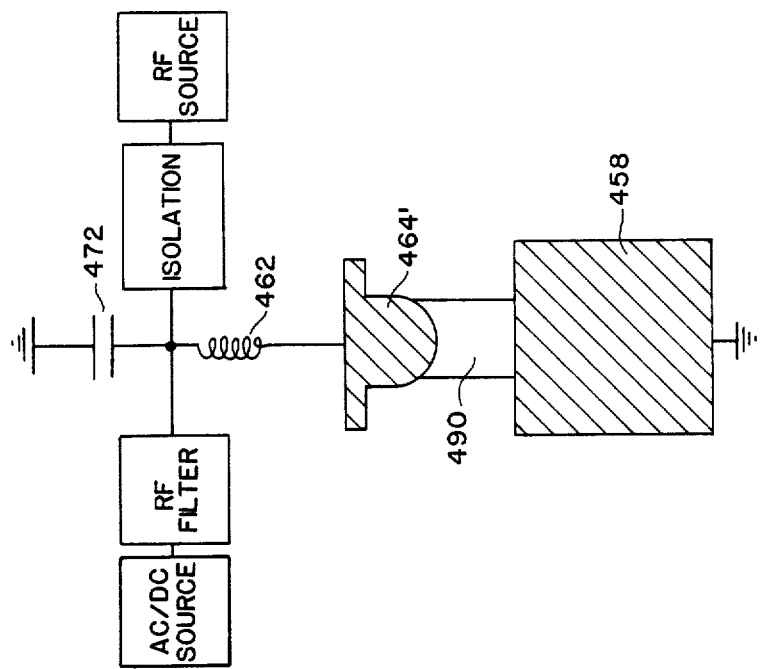
FIG. 28 is an enlarged fragmentary cross-sectional view, partly in schematic, of the transformer of FIG. 27 illustrating the region of RF and DC excitation.
Figure 27:
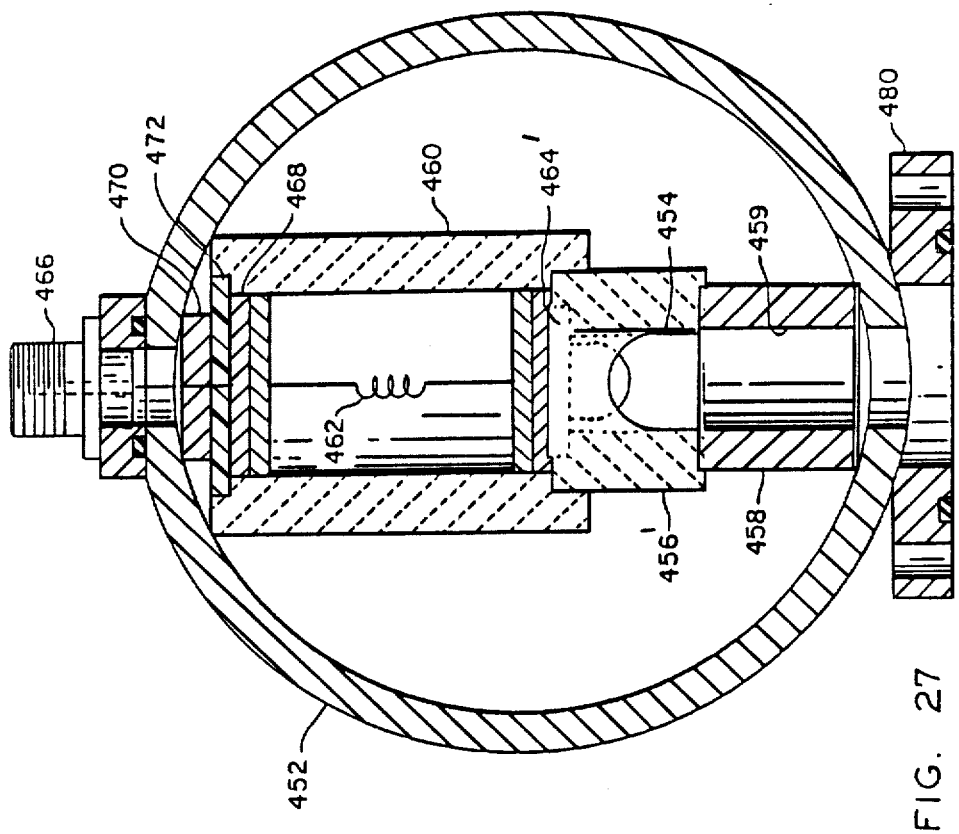
FIG. 27 is a cross-sectional view, partly in schematic, of a modified embodiment of the transformer of FIG. 25 with both RF and DC excitation.

The laser of FIGS. 25 and 26 can be adapted for RF plus DC excitation via connector 466. This may be achieved by replacing block 456 with a pair of ceramic spacers, such as spacers 212 shown in FIG. 10, or by notching block 456 and reshaping electrode 464 such that it defines one side of the discharge cavity as respectively shown in FIGS. 27 and 28. With RF and Dc (or low frequency AC) excitation, the RF energy will initiate the discharge while the DC source will supply power to the discharge. The discharge region 490 for the RF/DC or RF/AC discharge between electrodes 464' and 458 is illustrated in FIG. 28. Those skilled in the art will recognize the requirements for isolation and filtering dictated by RF/DC excitation and be able to accomplish the same without the exercise of invention.

While preferred embodiments of the foregoing invention have been set forth for purposes of illustration, the foregoing description should not be deemed a limitation of the invention herein. Accordingly, various modifications, alternatives and adaptations may be made by one skilled in the art without departing from the spirit and the scope of the present invention.

What is claimed is:

1. A gas laser having an RF transformer, said transformer comprising:
   first conductor means, said first conductor means having an axially extending electrically conductive surface portion and being electrically grounded;
   second conductor means, said second conductor means having an axially extending electrically conductive surface portion;
   third conductor means, said third conductor means having a electrically conductive surface portion, said third conductor means surface portion being spatially displaced from said first conductor means surface portion, said first and third conductor means surface portions cooperating to define therebetween an interior capacitance $C_x$, said third conductor means also at least in part defining an exterior capacitance $C_L$;
   means supporting said second conductor means such that the surface portion thereof is intermediate the surface portions of said first and third conductor means whereby said second conductor means divides said capacitance $C_x$ into a pair of capacitances $C_A$ and $C_B$;
   fourth conductor means for defining an axially extending space within said exterior capacitance $C_L$ between said third and fourth conductor means wherein the laser gas is disposed;
   at least one of said third conductor means and said fourth conductor means comprising a plurality of axially spaced, transversely extending plates;
   at least a first inductive element connected between a pair of said conductor means; and
   means for applying an RF voltage between said first and second conductor means, the frequency of said RF voltage being chosen to coincide with a minimum voltage standing wave ratio of the transformer input impedance.

2. The laser of claim 1 wherein said second conductor means and said third conductor means each comprise a plurality of axially spaced, transversely extending plates.

3. The laser of claim 2 further comprising a plurality of inductive elements connected between said second and third conductor means.

4. The laser of claim 1 wherein said third conductor means and said fourth conductor means each comprise a plurality of axially spaced, transversely extending plates.

5. The laser of claim 4 wherein the transversely extending plates of said third conductor means project towards said fourth conductor means and the transversely extending plates of said fourth conductor means project toward said third conductor means in axially spaced alternating relationship.

6. The laser of claim 5 further comprising a gas discharge tube disposed in said axially extending space and wherein at least some of said transversely extending plates have distal end portions shaped to engage and support said gas discharge tube.

7. The laser of claim 4 further comprising a plurality of inductive elements connected between said third and fourth conductor means.

8. The laser of claim 1 further comprising a plurality of inductive elements connected between said first and third conductor means.

9. An RF gas laser having an RF transformer, said transformer comprising:
   first conductor means, conductor means having an axially extending electrically conductive surface portion and being electrically grounded;
   second conductor means, said second conductor means having an axially extending electrically conductive surface portion;
   third conductor means, said third conductor means having an electrically conductive surface portion, said third conductor means surface portion being spatially displaced from said first conductor means surface portion, said first and third conductor means surface portions cooperating to define therebetween an interior capacitance $C_x$, said third conductor means also at least in part defining an exterior capacitance $C_L$ to ground;
   means supporting said second conductor means such that the said surface portion thereof is intermediate to said surface portions of said first and third conductor means, said second conductor means dividing said capacitance $C_x$ into a pair of capacitances $C_A$ and $C_B$;
   fourth conductor means for defining an axially extending region within capacitance $C_L$, said fourth conductor means including an oppositely disposed discharge electrode with which cooperates with said third conductor means;
   at least one of said third conductor means and said oppositely disposed discharge electrode having a contoured portion which at least partially defines a discharge gap of predetermined shape within said region;
   at least a first inductive element connected between a pair of said conductor means; and
   means for applying an RF voltage between said first and second conductor means, the frequency of said RF voltage being chosen to provide a minimum voltage standing wave ratio of the laser input impedance.

10. The laser of claim 9 further comprising a ceramic element extending from at least one of said second conductor means or said discharge electrode to at least partially define said discharge gap.

11. The laser of claim 9 wherein said second conductor means is shaped to define the field distribution in said discharge gap for discharge excitation .

12. The laser of claim 9 further comprising an axially extending housing enclosing at least said third conductor means.

13. The laser of claim 9 further comprising means defining a gas flow path traversing said gap and axially extending therethrough.

14. The laser of claim 13 further comprising a plurality of axially spaced ports communicating with said gas flow path.

15. The laser of claim 9 further comprising means for coupling a source of direct current to said third conductor means.

16. The laser of claim 9 further comprising means for coupling a source of low frequency alternating current to said third conductor means.

17. An RF excited gas laser having an RF transformer, said transformer comprising:
   first conductor means, said first conductor means having an axially extending electrically conductive surface portion and being electrically grounded;
   second conductor means, said second conductor means having an axially extending electrically conductive surface portion;
   third conductor means, said third conductor means having a electrically conductive surface portion, said third conductor means surface portion being spatially displaced from said first conductor means surface portion, said first and third conductor means surface portions cooperating to define therebetween an interior capacitance $C_x$, said third conductor means also at least in part defining an exterior capacitance $C_L$;
   means supporting said second conductor means such that the surface portion thereof is intermediate the surface portions of said first and third conductor means whereby said second conductor means divides said capacitance $C_x$ into a pair of capacitances $C_A$ and $C_B$;
   fourth conductor means for defining an axially extending space within said exterior capacitance $C_L$, said fourth conductor means being electrically grounded;
   at least a first inductive element connected between a pair of said conductor means;
   means for confining a gas in said axially extending space,
   means for applying an RF voltage between said first and second conductor means to initiate a discharge in said gas, the frequency of said RF voltage being chosen to coincide with a minimum voltage standing wave ratio of the transformer input impedance; and
   means for coupling a source of current to said third conductor means to supply electrical power to the discharge.

18. The laser of claim 17 further comprising an axially extending housing enclosing at least said third conductor means.

* * * * *